(12) United States Patent
Watson et al.

(10) Patent No.: US 8,997,091 B1
(45) Date of Patent: Mar. 31, 2015

(54) TECHNIQUES FOR COMPLIANCE TESTING

(75) Inventors: Thomas L. Watson, Richardson, TX (US); Fredrick A. Crable, Allen, TX (US)

(73) Assignee: EMC Corporation, Hopkinton, MA (US)

( * ) Notice: Subject to any disclaimer, the term of this patent is extended or adjusted under 35 U.S.C. 154(b) by 1803 days.

(21) Appl. No.: 11/700,388

(22) Filed: Jan. 31, 2007

(51) Int. Cl.
*G06F 9/445* (2006.01)

(52) U.S. Cl.
CPC ... *G06F 8/60* (2013.01); *G06F 8/64* (2013.01)
USPC .......................................... 717/175; 717/170

(58) Field of Classification Search
None
See application file for complete search history.

(56) References Cited

U.S. PATENT DOCUMENTS

| | | | |
|---|---|---|---|
| 5,619,688 A * | 4/1997 | Bosworth et al. ..................... 1/1 |
| 5,623,403 A * | 4/1997 | Highbloom ..................... 705/28 |
| 6,041,330 A * | 3/2000 | Carman et al. ........................ 1/1 |
| 6,389,129 B1 * | 5/2002 | Cowan ..................... 379/221.03 |
| 6,466,971 B1 * | 10/2002 | Humpleman et al. ........ 709/220 |
| 6,519,626 B1 * | 2/2003 | Soderberg et al. ............ 709/203 |
| 6,542,899 B1 * | 4/2003 | Saulpaugh et al. ..................... 1/1 |
| 6,591,272 B1 * | 7/2003 | Williams .............................. 1/1 |
| 6,611,843 B1 * | 8/2003 | Jacobs ................................... 1/1 |
| 6,684,219 B1 * | 1/2004 | Shaw et al. ........................... 1/1 |
| 6,775,829 B1 * | 8/2004 | Kroening ..................... 717/175 |
| 6,820,069 B1 | 11/2004 | Kogan et al. |
| 6,901,440 B1 * | 5/2005 | Bimm et al. ................... 709/223 |
| 6,917,930 B1 * | 7/2005 | Brodale et al. ................ 707/770 |
| 6,978,301 B2 | 12/2005 | Tindal |
| 7,020,573 B2 * | 3/2006 | Wheeler et al. ............... 702/121 |
| 7,076,543 B1 | 7/2006 | Kirti et al. |
| 7,150,037 B2 | 12/2006 | Wolf et al. |
| 7,222,130 B1 * | 5/2007 | Cras et al. ..................... 707/803 |
| 7,289,997 B1 * | 10/2007 | Kita et al. .............................. 1/1 |
| 7,814,093 B2 * | 10/2010 | Meyers et al. ................ 707/714 |
| 7,979,449 B2 * | 7/2011 | Holster ......................... 707/755 |
| 8,055,672 B2 * | 11/2011 | Djugash et al. ............... 707/766 |
| 8,073,836 B2 * | 12/2011 | McNall et al. ................ 707/713 |
| 2001/0016880 A1 * | 8/2001 | Cai et al. ....................... 709/321 |
| 2002/0062475 A1 * | 5/2002 | Iborra et al. ................... 717/108 |
| 2002/0073089 A1 * | 6/2002 | Schwartz et al. ............... 707/10 |
| 2002/0091702 A1 * | 7/2002 | Mullins ......................... 707/100 |
| 2002/0100039 A1 * | 7/2002 | Iatropoulos et al. ........... 725/24 |
| 2002/0174228 A1 * | 11/2002 | Kanemaki et al. ............ 709/226 |
| 2002/0184533 A1 | 12/2002 | Fox |
| 2003/0005019 A1 * | 1/2003 | Pabla et al. ........................ 709/1 |
| 2003/0037040 A1 * | 2/2003 | Beadles et al. ..................... 707/1 |
| 2003/0084135 A1 * | 5/2003 | Narain ........................... 709/223 |
| 2003/0084348 A1 * | 5/2003 | Miyao et al. .................. 713/201 |
| 2003/0135596 A1 * | 7/2003 | Moyer et al. .................. 709/223 |
| 2003/0153991 A1 | 8/2003 | Visser et al. |
| 2003/0206100 A1 * | 11/2003 | Richman et al. .............. 340/506 |

(Continued)

*Primary Examiner* — Jason Mitchell
(74) *Attorney, Agent, or Firm* — Muirhead and Saturnelli, LLC

(57) ABSTRACT

Described are techniques for performing compliance testing. Configuration state information is received for one or more devices managed using a configuration management system. The configuration state information is stored in a data container. One or more compliance tests are executed using the configuration state information to determine if the one or more devices are compliant. The one or more compliance tests are defined using one or more queries and one or more compliance rules. The one or more queries are used for retrieving a portion of said configuration state information from said data container and generating one or more result sets. The one or more compliance rules specifying compliance criteria are used for determining whether the one or more result sets include configuration state information which is compliant.

55 Claims, 25 Drawing Sheets

600

```
<Device>
    <Hostname>D1</Hostname>
    <ManagementIpAddress>10.5.3.2</ManagementIpAddress>
    <SerialNumber>100001</SerialNumber>
    <AccessList>
        <Name>ACL1</Name>
        <AccessListType>Extended</AccessListType>
        <AccessListRule>
            <Action>Permit</Action>
            <SourceIpAddress>2.3.4.5</SourceIpAddress>
            <DestinationPortNumber>16</DestinationPortNumber>
        </AccessListRule>
        <AccessListRule>
            <Action>Deny</Action>
            <SourceIpAddress>9.9.9.9</SourceIpAddress>
        </AccessListRule>
    </AccessList>
</Device>
```

(56) References Cited

U.S. PATENT DOCUMENTS

| | | | |
|---|---|---|---|
| 2004/0059946 A1* | 3/2004 | Price | 713/201 |
| 2004/0111712 A1* | 6/2004 | Humpert et al. | 717/136 |
| 2004/0181790 A1* | 9/2004 | Herrick | 717/168 |
| 2004/0205174 A1* | 10/2004 | Snyder et al. | 709/223 |
| 2005/0010566 A1* | 1/2005 | Cushing et al. | 707/3 |
| 2005/0172269 A1* | 8/2005 | Johnson et al. | 717/124 |
| 2006/0004923 A1* | 1/2006 | Cohen et al. | 709/228 |
| 2006/0031763 A1* | 2/2006 | Yeung | 715/523 |
| 2006/0080313 A1* | 4/2006 | Freire | 707/5 |
| 2006/0173881 A1* | 8/2006 | Pfeifer | 707/101 |
| 2006/0195427 A1* | 8/2006 | Kilroy | 707/3 |
| 2006/0242563 A1* | 10/2006 | Liu et al. | 715/513 |
| 2006/0247878 A1* | 11/2006 | Manfredi | 702/108 |
| 2007/0143739 A1* | 6/2007 | Taber, III | 717/114 |
| 2007/0255826 A1* | 11/2007 | Billingsley | 709/224 |
| 2008/0222629 A1* | 9/2008 | Rauma | 717/173 |
| 2009/0254876 A1* | 10/2009 | Kuriakose et al. | 717/105 |

\* cited by examiner

```
<Device>
    <Hostname>D1</Hostname>
    <ManagementIpAddress>10.5.3.2</ManagementIpAddress>
    <SerialNumber>100001</SerialNumber>
    <AccessList>
        <Name>ACL1</Name>
        <AccessListType>Extended</AccessListType>
        <AccessListRule>
            <Action>Permit</Action>
            <SourceIpAddress>2.3.4.5</SourceIpAddress>
            <DestinationPortNumber>16</DestinationPortNumber>
        </AccessListRule>
        <AccessListRule>
            <Action>Deny</Action>
            <SourceIpAddress>9.9.9.9</SourceIpAddress>
        </AccessListRule>
    </AccessList>
</Device>
```

FIG. 9

| Tables 810 | Table Alias 812 | Join On 814 | Include Null 816 |
|---|---|---|---|
| Device | d1 | | |
| AccessList | a1 | a1.DeviceID=d1.Id | x |
| AccessListRule | r1 | r1.AccessListId=a1.Id | x |

| Selection Column 820 | Selection Operator 822 | Selection Match Expression 824 | |
|---|---|---|---|
| d1.Hostname | = | D1 | |
| a1.Name | = | ACL1 | |

| Order By 830 | Descending 832 | | |
|---|---|---|---|
| r1.Id | | | |

FIG. 11

| Device Id | Device Hostname | Device Management-IpAddress | Device Serial-Number | Access-List Id | Access-List DeviceId | Access-List Name | Access-List AccessListType | Access-ListRule Id | Access-ListRule AccessListId | Access-ListRule SourceIpAddress | Access-ListRule DestinationPortNumber |
|---|---|---|---|---|---|---|---|---|---|---|---|
| 1 | D1 | 10.5.3.2 | 100001 | 2 | 1 | ACL1 | Extended | 3 | 2 | 2.3.4.5 | 16 |
| 1 | D1 | 10.5.3.2 | 100001 | 2 | 1 | ACL1 | Extended | 4 | 2 | 9.9.9.9 | |

| *Must Contain* | |
|---|---|
| r1.SourceIpAddress 1002 | r1.DestinationPortNumber 1004 |
| 9.9.9.9 | |
| 2.3.4.5 | 16 |

1010 (brace around data rows)

| Must Not Contain ||
|---|---|
| r1.SourceIpAddress | r1.DestinationPortNumber |
| 2.3.4.5 | 16 |

| Match Each Row: | | | |
|---|---|---|---|
| And or OR 1152 | Match Column 1554 | Match Operator 1156 | Match Expression 1158 |
| | a1.Name | = | ACL1 |
| AND | a1.Type | = | Extended |

| Must Contain: | Replicate On: a1 | | Ordered: x | Exact Match: |
|---|---|---|---|---|
| r1.SourceIpAddress | r1.DestinationPortNumber | | | |
| 9.9.9.9 | | | | |
| 2.3.4.5 | 16 | | | |
| Must Not Contain: | | | | |
| r1.SourceIpAddress | | | | |
| 10.11.12.13 | | | | |
| Match Each Row: | | | | |
| And or OR | Match Column | Match Operator | Match Expression | |
| | a1.Name | = | ACL1 | |
| AND | a1.Type | = | Extended | |

TECHNIQUES FOR COMPLIANCE TESTING

BACKGROUND

1. Technical Field

This application generally relates to compliance testing techniques, and more particularly to techniques used with testing the compliance of devices.

2. Description of Related Art

Compliance testing may be performed in connection with a variety of different areas. As one example, compliance testing may be performed in connection with one or more managed devices in connection with configuration management of those devices. The devices may be connected in a network. The devices may include any one or more different components such as, for example, routers, switches, firewalls, servers, network appliances, and the like. As part of compliance testing, configuration data may be gathered from the managed devices. The configuration data may be used in a compliance test in which a comparison of the collected configuration data is compared against compliance requirements expressed in any one of a variety of different forms. Some existing techniques for compliance testing express the compliance test in a source code representation. One drawback of such techniques is that the source code is often coded in accordance with a particular set of devices or a particular configuration data format. The foregoing can mean writing additional compliance tests tailored for each different device manufacturer and type of device. Additionally, any changes to the existing configuration data format may require modification to the compliance test source code and source code which implements a corrective or remedial action.

It may therefore be desirable to utilize techniques in connection with compliance testing which provide for automating one or more aspects of compliance testing. Such techniques may also be characterized as independent with respect to the configuration data format of the managed device or other entity for which compliance testing is performed. It may also be desirable that such techniques provide ease of use in connection with various modifications and additions with respect to collected configuration data and compliance testing.

SUMMARY OF THE INVENTION

In accordance with one aspect of the invention is a method for performing compliance testing comprising: receiving configuration state information for one or more devices managed using a configuration management system; storing the configuration state information in a data container; and executing one or more compliance tests using the configuration state information to determine if the one or more devices are compliant, said one or more compliance tests being defined using one or more queries and one or more compliance rules, said one or more queries used for retrieving a portion of said configuration state information from said data container and generating one or more result sets, said one or more compliance rules specifying compliance criteria used for determining whether said one or more result sets include configuration state information which is compliant. The data container may be a relational database, and the one or more queries may be relational queries. The data container may be an object-based database using an object model, and the one or more queries of the data container may generate one or more result sets representing query results in a hierarchical object representation. The method may also include specifying the relational queries using a tabular form, the tabular form including a first section identifying one or more database tables and a second section identifying one or more database table columns and selection criteria used for determining said portion of the configuration state information to be included in the one or more result sets. The tabular form may include a third section identifying how to order rows of said one or more result sets. The method may include forming one or more standard query language queries using the information included in the tabular form. The compliance rules may include one or more rules defining one or more rows of configuration state information which are required to be included in the one or more result sets in order to determine that the one or more results sets include configuration state information which is compliant. The compliance rules may include one or more rules defining rows of configuration state information which are required not to be included in the one or more result sets in order to determine that the one or more results sets include configuration state information which is compliant. The compliance rules may include one or more rules defining one or more attributes of configuration state information which are required to be included in each row of the one or more result sets in order to determine that the one or more results sets include configuration state information which is compliant. The method may also include, in response to determining a compliance test failure for a device, automatically generating a corresponding remedial action to correct configuration state information of the device which caused the compliance test failure. The method may include: determining a device is a non-compliant device if configuration state information for the device is not included in the one or more result sets and is required to be included in the one or more result sets as specified in accordance with the compliance rules; and generating a remedial action causing required configuration state information to be added to the non-compliant device. The method may include: determining a device is a non-compliant device if configuration state information for the device is included in the one or more result sets and is required not to be included in the one or more result sets as specified in accordance with the compliance rules; and generating a remedial action causing configuration state information to be deleted from the non-compliant device. The method may include: determining a device is a non-compliant device if configuration state information for the device that is included in the one or more result sets omits a required attribute value or includes an incorrect attribute value as specified in accordance with the compliance rules; and generating a remedial action causing configuration state information for an attribute value to be one of corrected or added from the non-compliant device in accordance with said compliance rules. The data container may be a database and a structure of configuration state information as stored in the database may be specified using metadata stored in the database, and wherein said automatically generating a corresponding remedial action may further comprise: using at least a portion of said metadata in connection with determining relevant database tables and database table columns of a non-compliant portion of configuration state information for the device which caused the compliance test failure; and constructing a portion of compliant configuration state information corresponding to the non-compliant portion. The step of automatically generating a corresponding remedial action may further comprise: generating an object including compliant configuration state information, a first portion of said compliant configuration state information being determined using at least one compliance test, and a second portion of said compliant state information being determined using existing configuration state information from the database for the device which caused the compliance test failure. The method may also include generating, in accordance with the object, one or more device commands for the device which caused the compliance test failure. The method may include generating, in accordance with the object, one or more updates to accordingly modify configuration of the device which caused the compliance test failure. The metadata may include relationship information regarding relationships between objects of configuration state information represented in the database, the metadata describing how a first database table is joined with another database table when specifying a compliance query, the first and the second database tables being joined in connection with forming the one or more result sets. A first column in the first database table may be associated with a second column in the other database table, said association between said first column and said second column being expressed in the metadata. At least one query may include object names used in representing configuration state information in a first representation, each of said object names having corresponding elements in a second representation describing how the configuration state information is stored in the data container, and the method may include mapping object names in the at least one query to corresponding elements in the second representation using metadata when constructing a query to retrieve data from the data container. The method may include using metadata to determine allowable operators in connection with constructing the query. The method may include performing data validation using metadata to determine whether items included in the query are defined in a representation of the configuration state information. The data container may store more than one set of configuration information for at least one of the devices.

In accordance with another aspect of the invention is a method for performing compliance testing of information stored in a data container, the method comprising: receiving state information describing a current state; storing the state information in a data container; executing one or more compliance tests using the state information to determine if the state information is compliant, said one or more compliance tests being defined using one or more queries and one or more compliance rules, said one or more queries used for retrieving a portion of said state information from said data container and generating one or more result sets, said one or more compliance rules specifying compliance criteria used for determining whether said one or more result sets include state information which is compliant; and automatically determining one or more remedial actions for state information determined to be non-compliant. The one or more compliance rules may include at least one of the following types of rules: a first type of rule defining one or more rows of configuration state information which are required to be included in the one or more result sets in order to determine that the one or more results sets include configuration state information which is compliant, a second type of rule defining rows of configuration state information which are required not to be included in the one or more result sets in order to determine that the one or more results sets include configuration state information which is compliant, and a third type of rule defining one or more attributes of configuration state information which are required to be included in each row of the one or more result sets in order to determine that the one or more results sets include configuration state information which is compliant. The data container may be a relational database and the one or more queries may be relational queries, and the method may include specifying the relational queries using a tabular form, the tabular form including a first section identifying one or more database tables and a second section identifying one or more database table columns and selection criteria used for determining said portion of the configuration state information to be included in the one or more result sets. The method may also include, in response to determining a compliance test failure for a device, automatically generating a corresponding remedial action to correct configuration state information of the device which caused the compliance test failure. The method may also include generating one or more device commands for the device which caused the compliance test failure, the one or more device commands being in accordance with the compliance test failure to correctly configure the device. The method may include generating, in accordance with the object, one or more updates to accordingly modify configuration of the device which caused the compliance test failure. A structure of configuration state information as stored in the database may be specified using metadata stored in the database, and the step of automatically generating a corresponding remedial action may further include: using at least a portion of said metadata in connection with determining relevant database tables and database table columns of a non-compliant portion of configuration state information for the device which caused the compliance test failure; and constructing a portion of compliant configuration state information corresponding to the non-compliant portion. The step of automatically generating a corresponding remedial action may further comprise generating an object including compliant configuration state information, a first portion of said compliant state information being determined using at least one compliance test, and a second portion of said compliant state information being determined using existing configuration state information from the data container for the device which caused the compliance test failure.

In accordance with another aspect of the invention is a network configuration management system comprising: a device server collecting configuration information from one or more devices managed using the network configuration management system; and one or more application servers which store the configuration information in a database and perform compliance testing on the configuration information using compliance queries and compliance rules, the compliance queries used to retrieve portions of the configuration information from the database forming one or more result sets which are tested for compliance in accordance with the compliance rules.

In accordance with another aspect of the invention is a method for performing compliance testing comprising: receiving configuration state information for one or more devices managed using a configuration management system; storing the configuration state information in a database; and performing one or more compliance tests using the configuration state information to determine if the one or more devices are compliant, wherein said configuration state information is represented in accordance with a data representation described using metadata, wherein said performing uses the metadata in connection with processing at least one of: one or more compliance queries for retrieving data from the database for compliance testing, and one or more compliance rules specifying compliance criteria. The metadata may identify one or more relational database tables of the database describing the data representation of the configuration state information. The metadata may identify one or more columns in the one or more relational database tables describing the data representation. The metadata may describe one or more relationships between different types of objects. The relationships represented using the metadata may include one or more of: one to one, many to many, many to one, one to many, hierarchical, non-hierarchical, and revisioned for multiple versions of configuration information. The metadata may include information used to convert configuration state information between a first form as collected by a device server and a second form which is an object representation, and to convert between the second form and a third form which is a relational database representation as stored in the database. The method may also include, in response to a compliance test failure, generating a remedial action using metadata describing the relationships between objects to form a compliant object including compliant information in accordance with compliance test failure. The metadata may describe an external data representation and the metadata is used to convert data from the external data representation to the data representation for use with the database, and metadata describing the external data representation is accordingly modified if there is a modification to the external data representation. The metadata may indicate an atomicity level used in connection with generating a remedial action, the atomicity level being used in determining a minimum level of the compliant object. The metadata may be used in said performing to map a logical name of an object representation to a corresponding entity in a relational database representation, the logical name being included in at least one of a compliance query or a compliance rule. The metadata may include attribute information used to implicitly join a plurality of database tables corresponding to a single object in the object representation. The metadata may be stored in the database.

In accordance with another aspect of the invention is a method for performing reporting on a configuration state of one or more devices comprising: receiving configuration state information for one or more devices managed using a configuration management system; storing the configuration state information in a database; and performing one or more database queries using metadata, wherein the metadata identifies one or more relational database tables of the database describing the data representation of said configuration state information, identifies one or more columns in the one or more relational database tables describing a data representation of the configuration state information, and identifies one or more relationships between different types of objects in said configuration state information; forming, in response to said performing, one or more query results; and using the one or more query results in a report. The relationships represented using the metadata may include one or more of: one to one, many to many, many to one, one to many, hierarchical, non-hierarchical, and revisioned for multiple versions of configuration information. The metadata may include information used to convert configuration state information between a first form as collected by a device server and a second form which is an object representation, and to convert between the second form and a third form which is a relational database representation as stored in the database. The metadata may describe an external data representation and the metadata is used to convert data from the external data representation to the data representation for use with the database, and metadata describing the external data representation may be accordingly modified if there is a modification to the external data representation. The metadata may include attribute information used to implicitly join a plurality of database tables corresponding to a single object in the object representation. The metadata may be stored in the database.

In accordance with another aspect of the invention is a computer readable medium comprising code stored thereon for performing compliance testing, the computer readable medium comprising code stored thereon for: receiving configuration state information for one or more devices managed using a configuration management system; storing the configuration state information in a data container; and executing one or more compliance tests using the configuration state information to determine if the one or more devices are compliant, said one or more compliance tests being defined using one or more queries and one or more compliance rules, said one or more queries used for retrieving a portion of said configuration state information from said data container and generating one or more result sets, said one or more compliance rules specifying compliance criteria used for determining whether said one or more result sets include configuration state information which is compliant. The data container may be a relational database, and the one or more queries may be relational queries. The computer readable medium may also include code for specifying the relational queries using a tabular form, the tabular form including a first section identifying one or more database tables and a second section identifying one or more database table columns and selection criteria used for determining said portion of the configuration state information to be included in the one or more result sets. The tabular form may include a third section identifying how to order rows of said one or more result sets. The computer readable medium may also include code for forming one or more standard query language queries using the information included in the tabular form. The compliance rules may include one or more rules defining one or more rows of configuration state information which are required to be included in the one or more result sets in order to determine that the one or more results sets include configuration state information which is compliant. The compliance rules may include one or more rules defining rows of configuration state information which are required not to be included in the one or more result sets in order to determine that the one or more results sets include configuration state information which is compliant. The compliance rules may include one or more rules defining one or more attributes of configuration state information which are required to be included in each row of the one or more result sets in order to determine that the one or more results sets include configuration state information which is compliant. The computer readable medium may also include code for, in response to determining a compliance test failure for a device, automatically generating a corresponding remedial action to correct configuration state information of the device which caused the compliance test failure.

In accordance with another aspect of the invention is a computer readable medium comprising code stored thereon for performing compliance testing, the computer readable medium comprising code for: receiving configuration state information for one or more devices managed using a configuration management system; storing the configuration state information in a database; and performing one or more compliance tests using the configuration state information to determine if the one or more devices are compliant, wherein said configuration state information is represented in accordance with a data representation described using metadata, wherein said performing uses the metadata in connection with processing at least one of: one or more compliance queries for retrieving data from the database for compliance testing, and one or more compliance rules specifying compliance criteria. The metadata may identify one or more relational database tables of the database describing the data representation of the configuration state information. The metadata may describe one or more relationships between different types of objects, and wherein the relationships represented using the metadata may include one or more of: one to one, many to many, many to one, one to many, hierarchical, non-hierarchical, and revisioned for multiple versions of configuration information. The computer readable medium may include code for, in response to a compliance test failure, generating a remedial action using metadata describing the relationships between objects to form a compliant object including compliant information in accordance with compliance test failure.

In accordance with another aspect of the invention is a computer readable medium comprising code stored thereon for performing reporting on a configuration state of one or more devices, the computer readable medium comprising code for: receiving configuration state information for one or more devices managed using a configuration management system; storing the configuration state information in a database; and performing one or more database queries using metadata, wherein the metadata identifies one or more relational database tables of the database describing the data representation of said configuration state information, identifies one or more columns in the one or more relational database tables describing a data representation of the configuration state information, and identifies one or more relationships between different types of objects in said configuration state information; forming, in response to said performing, one or more query results; and using the one or more query results in a report. The relationships represented using the metadata may include one or more of: one to one, many to many, many to one, one to many, hierarchical, non-hierarchical, and revisioned for multiple versions of configuration information.

BRIEF DESCRIPTION OF THE DRAWINGS

Features and advantages of the present invention will become more apparent from the following detailed description of exemplary embodiments thereof taken in conjunction with the accompanying drawings in which:

FIG. 9 is an example illustrating an XML representation;

FIG. 11 is an example illustrating a compliance query form;

FIG. 12 is an example illustrating a result set representation;

FIGS. 13-16 are examples illustrating compliance rule specifications;

DETAILED DESCRIPTION OF EMBODIMENT(S)

Figure 1:
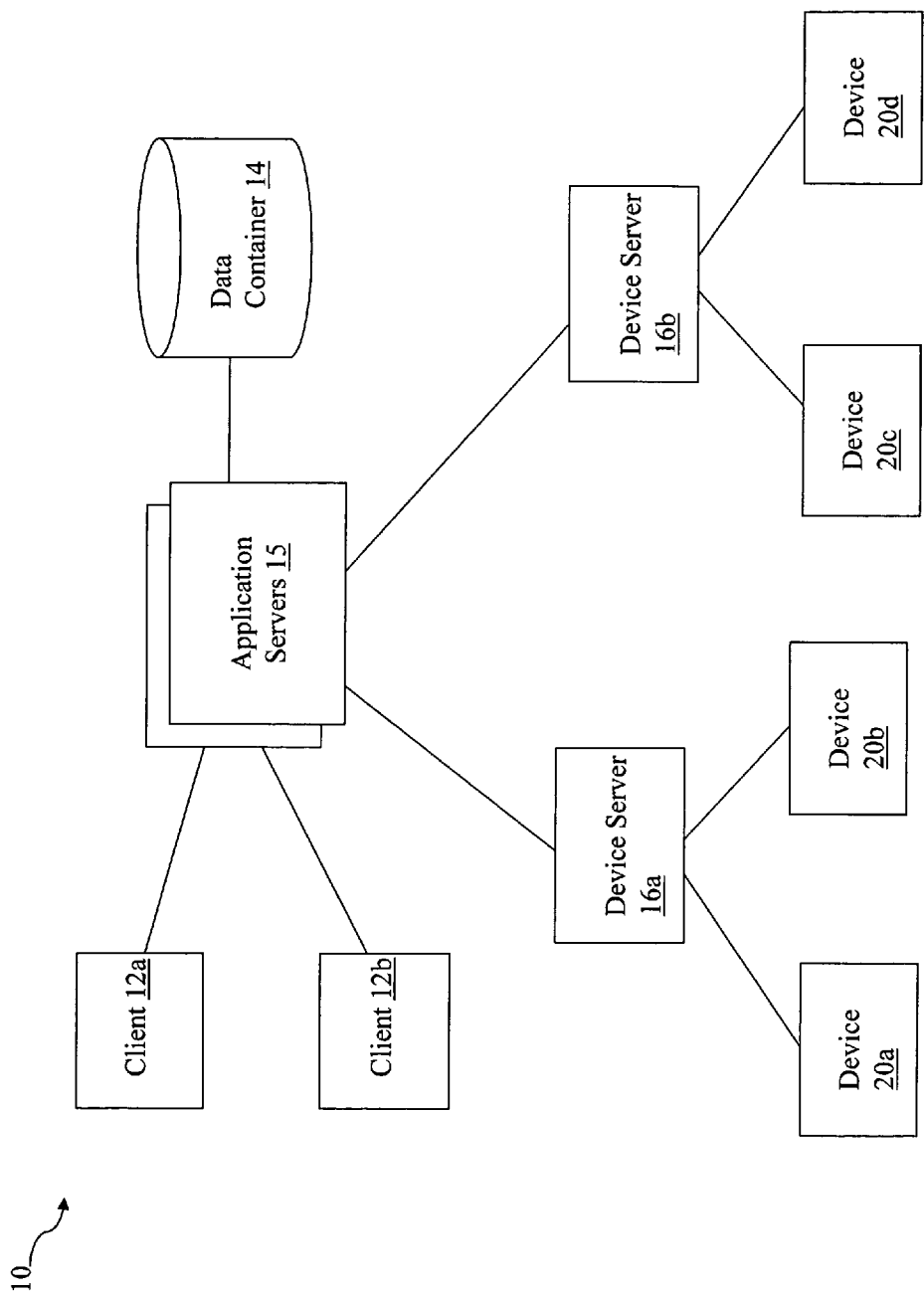
FIG. 1 is an example of an embodiment of a system that may utilize the techniques described herein.

Referring now to FIG. 1, shown is an example of an embodiment of a computer system that may be used in connection with performing the techniques described herein. The computer system 10 includes one or more client systems 12a and 12b, one or more application servers 15, one or more device servers 16a and 16b, and one or more devices 20a-20d. The components of FIG. 1 may be connected through any one or more communication connections of the same or different types. The communication connections may be any one or more of a variety of networks or other type of communication connections as known to those skilled in the art. Each of the communication connections between components of FIG. 1 may be a network connection, or other type of data link, such as a hardwire or other connections known in the art. For example, the communication connection may be the Internet, an intranet, other network connection which can be wireless or hardwired by which the components may communicate with each other as well as other components (not shown) that may be connected thereto. In one embodiment, the communication connection between the components of FIG. 1 may be a LAN connection.

The system of FIG. 1 may be used in connection with management activities, such as compliance testing of one or more managed devices. The techniques herein provide for testing the compliance of a configuration state of each managed device with respect to compliance data setting forth an expected configuration state. In the event of non-compliance, an embodiment utilizing the techniques herein may automatically generate remedial actions that can be applied to a managed device in order to make the device compliant with the expected configuration state. The managed device's configuration state may be persisted in a data container, such as a database, in any one of a variety of different forms. In one embodiment described herein, the data container may be a relational database having data accessed using SQL queries. The data stored in the relational database may be represented as a hierarchical set of attributed objects. Compliance testing techniques described herein may be performed by utilizing one or more SQL queries to retrieve configuration state of a device from the database and applying one or more rules representing the expected configuration or compliant requirements to the query results in order to determine whether the configuration state is compliant. Remedial actions may be generated which result in issuance of one or more communications to the managed device. The communications may be, for example, commands to appropriately reset and reconfigure the device in an attempt to place the device in compliance with the expected configuration state.

An embodiment utilizing the techniques herein may also utilize metadata that describes the data used for querying and compliance testing. The metadata may be used in connection with making modifications and additions to the data models used in connection with the techniques herein without making changes to source code that may be included in an embodiment as described herein. The foregoing use of metadata facilitates making data modifications to the model of the configuration state data. As will also be described herein, an embodiment may utilize metadata in a wide variety of uses such as, for example, in connection with processing steps for compliance testing, to allow users and third party integrators the ability to add collected configuration state information which is in a third party form, and the like.

With reference to again to FIG. 1, network configuration management (NCM) components, such as software modules, may utilize the techniques herein for device configuration and management. The NCM components may implement a distributed system with client portions executing on the client system 12a, 12b. The client software on the systems 12a,12b may be used on connection with user interface activities such as screen representations, user input validations and communicating with the application server 15. Other portions of the NCM components may be included in the application server 15. As known in the art, NCM components may be used to perform discovery processing to discover the existence of one or more managed devices 20a-20d and also periodically retrieve and store the configuration state of the managed devices. The managed devices may be of various types, such as IP (Internet Protocol) routers, switches, firewalls, network appliances, and servers, such as servers hosting applications and storage servers. It should be noted that the foregoing is not an exhaustive list of the different types of devices that may be used in connection with the techniques herein. A device may be any device that has the necessary connectivity and other functionality as described herein.

The NCM components may include software executed on the application server 15 to facilitate collecting and management of the configuration state information of devices 20a-20d received from one or more device servers 16a,16b. Actual communication with the devices 20a-20d for retrieval of configuration state information may be handled by the device servers 16a-16b. Each device server may include software, such as a device driver, which communicates with a particular family of devices, interprets data received from a particular family of devices in accordance with a particular format, and also transmits data to the device in accordance with the particular format. As such, a device server may be customized to include the necessary components for facilitating communications with a particular family and/or type of device. An embodiment using the techniques herein may include different device servers corresponding to different families of devices being managed.

The configuration state information may represent the collection of information relevant to the operation and status of one of the devices 20a-20d. The configuration state information may include, for example, static configuration information, dynamic configuration information, or operational status information. The configuration state information may be received from a device in a format particular to that device. The actual data received from a device may be characterized as the raw collected data which may be converted to a different form for use with the techniques herein. The raw collected data may be in any one of a variety of different forms and formats such as, for example, a text format (e.g., such as one or more configuration files), in XML (Extensible Markup Language) format (where XML elements represent objects or attributes), or in binary form. As will be described in more detail herein, the raw data may be converted to a vendor-neutral XML format. Such conversion may be performed, for example, by each device server.

The application server 15 may manage the collected configuration state information which is stored in a data container 14. In one embodiment, the data container may be a relational database. It will be appreciated by those skilled in the art that the techniques herein may be used with a variety of different types of databases and other data storages. The application server may also include components thereon for generating reports, executing compliance audits, servicing calls from the clients 12a-12b, interfacing with other external systems, and the like. In one embodiment, the NCM components may be configured to retrieve and persist a configuration state of a device in response to a trigger event such as, for example, when a change in the device's configuration is detected or reported, in response to a request of personnel, such as may be issued using one of the clients 12a,12b, and the like. An embodiment may save more than one set of configuration state information for each device in the database or other data container 14. Each such set of configurations state information may be associated with a unique revision number. Multiple sets of such information may represent a history of a device's configuration information over time.

Network managers, operators or other personnel may want to define operational standards, referred to as compliance standards or requirements, for use with networks or collections of devices being managed in order to ensure that the devices are operating securely, consistently, and correctly. In connection with the techniques herein, the foregoing may be expressed as a set of one or more compliance tests. Each compliance test may check one aspect of a device or network's configuration state against pre-defined criteria that may be specified by the network personnel. A managed device may be deemed compliant if all the compliance tests applied to the device successfully determine that the device is compliant. A device may be characterized as non-compliant if one or more of the compliance tests fail. Network operations personnel may obtain reports regarding which devices being managed are compliant and which are non-compliant. The cause of any non-compliance may also be identified in accordance with the particular compliance test.

In connection with techniques herein, compliance tests which fail may optionally generate remedial actions which can be applied to a failing managed device in order to bring the managed device into compliance. In one embodiment, the remedial actions may be applied by sending explicit command(s) to a device to change the device's current configuration to one that will be compliant with the compliance test criteria. The remedial actions may be applied automatically, or scheduled as a job to be run at a time determined by network operations personnel. In one embodiment, one or more remedial actions may be consolidated for execution at a later scheduled time in the form of a job. In this case, the one or more remedial actions included in the job are applied to the device when the job is executed.

The processors included in the client systems 12a-12b, application server 15, and device servers 16a-16b may be any one of a variety of proprietary or commercially available single or multi-processor system, such as an Intel-based processor, or other type of commercially available processor able to perform the processing described herein. The one or more processors of the devices 20a-20d being managed may vary with the particular device vendor and type.

It should be noted that the particular examples of the hardware and/or software that may be included in various components of FIG. 1 are described for illustration in connection with the techniques herein and should not be construed as a limitation of the more general applicability of the techniques herein as will be appreciated by those skilled in the art.

The components of FIG. 1 may all be located at the same physical site, or, alternatively, may also be located in different physical locations. In connection with communication connections between the various components in the system 10, a variety of different communication protocols may be used such as IP, Ethernet, SCSI, Fibre Channel, iSCSI, and the like. Some or all of the connections by which the components of FIG. 1 may be connected to each other may pass through other communication devices, such switching equipment that may exist such as a phone line, a repeater, a multiplexer or even a satellite.

It should be noted that although particular numbers of devices, device servers, application servers, client systems, and the like are included in FIG. 1, an embodiment using the techniques herein may include any number of each of the foregoing. Additionally, a single device may be connected to more than a single device server.

Figure 2:
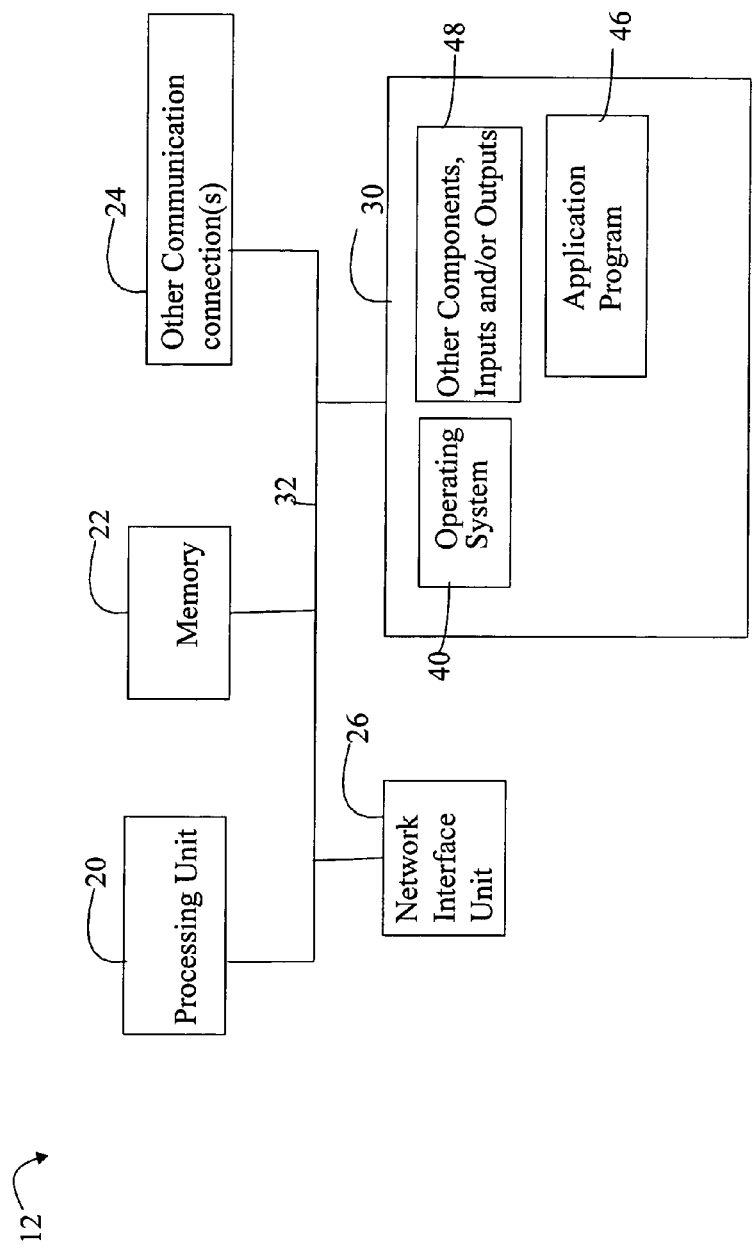
FIG. 2 is an example of an embodiment of components that may be included in a client illustrated in FIG. 1 in connection with techniques described herein.

Referring now to FIG. 2, shown is an example of components that may be included in the a client system 12, such as one of the client systems 12a-12b in connection with performing the various embodiments of the techniques described herein. The client system 12 may be a computer system including one or more processing units 20, memory 22, a network interface unit 26, storage 30, one or more other communication connections 24, and a system bus 32 used to facilitate communications between the components of the client system 12.

Depending on the configuration and type of client system 12, memory 22 may be volatile (such as RAM), non-volatile (such as ROM, flash memory, etc.) or some combination of the two. Additionally, the client system 12 may also have additional features/functionality. For example, the client system 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the client system 12. The storage 30 in one embodiment may be a mass-storage device with associated computer-readable media providing non-volatile storage for the client system 12. Although the description of computer-readable media as illustrated in this example may refer to a mass storage device, such as a hard disk or CD-ROM drive, it will be appreciated by those skilled in the art that the computer-readable media can be any available media that can be accessed by the client system 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by client system 12. Computer storage media typically embodies computer readable instructions, data structures, program modules or other data in connection with performing the techniques described herein.

The client system 12 may also contain communications connection(s) 24 that allow the system to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the client system 12 may operate in a networked environment as illustrated in FIG. 1 using logical connections to remote computers through a network. The client system 12 may connect to the network of FIG. 1 through a network interface unit 26 connected to bus 32. The network interface unit 26 may also be utilized in connection with other types of networks and/or remote systems and components.

One or more program modules and/or data files may be included in storage 30. During operation of the client system 12, one or more of these elements included in the storage 30 may also reside in a portion of memory 22, such as, for example, RAM for controlling the operation of the client system 12. The example of FIG. 2 illustrates various components including an operating system 40, one or more application programs 46, and other components, inputs, and/or outputs 48. In one embodiment, the application program 46 may be a web browser, a client-side application, or other application used when operating the client system 12 standalone as well as when the system 12 has external connectivity.

The operating system 40 may be any one of a variety of commercially available or proprietary operating systems. The operating system 40, for example, may be loaded into memory in connection with controlling operation of the user computer. One or more application programs 46 may execute in the client system 12 in connection with performing user tasks and operations.

Figure 3:
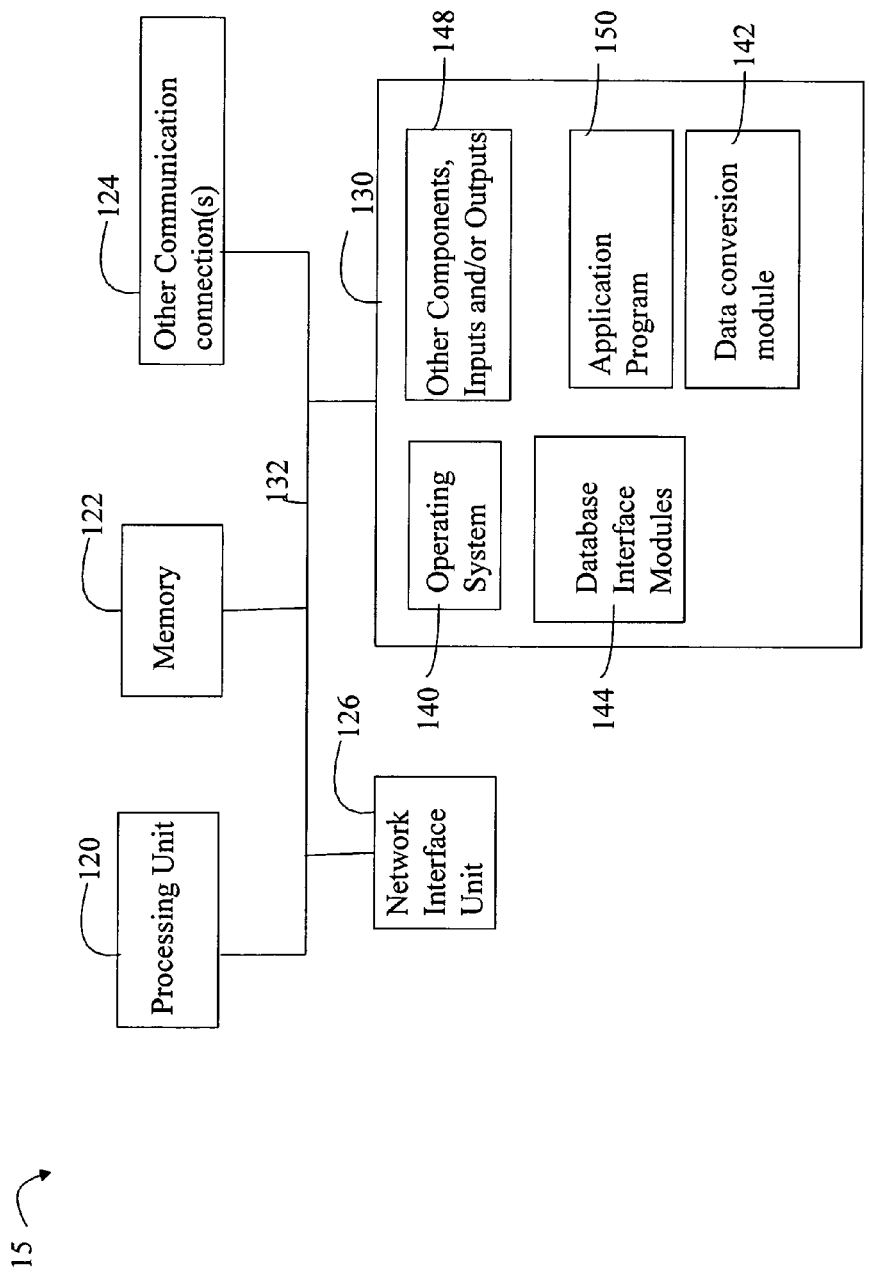
FIG. 3 is an example of an embodiment of components that may be included in an application server illustrated in FIG. 1 in connection with techniques described herein.

Referring now to FIG. 3, shown is an example of components that may be included in an application server 15 and used in connection with performing the various embodiments of the techniques described herein. As illustrated in FIG. 3, an embodiment of the application server 15 may include components similar to those described in connection with FIG. 2. In one embodiment the server 15 may include one or more operating systems 140, one or more application programs 150, one or more data conversion modules 142, one or more database interface modules 144, and other components, inputs and/or outputs 148. The application programs 150 may include server-based modules for performing various techniques described herein. The database interface modules 144 may include modules for interfacing with the relational database or other data container 14. The data conversion module 142 may be used in connection with converting data from one form to another form. In one embodiment, the data conversion modules 142 may be used in connection with converting data, such as data in a vendor neutral XML representation received from a device server, into another form, such as an object representation. As will also be described herein, the modules 142 may be used in connection with converting data between the object representation and a form for use in connection with the particular data container. Various modules and processing performed by the application server 15 are described in more detail in following paragraphs.

Figure 4:
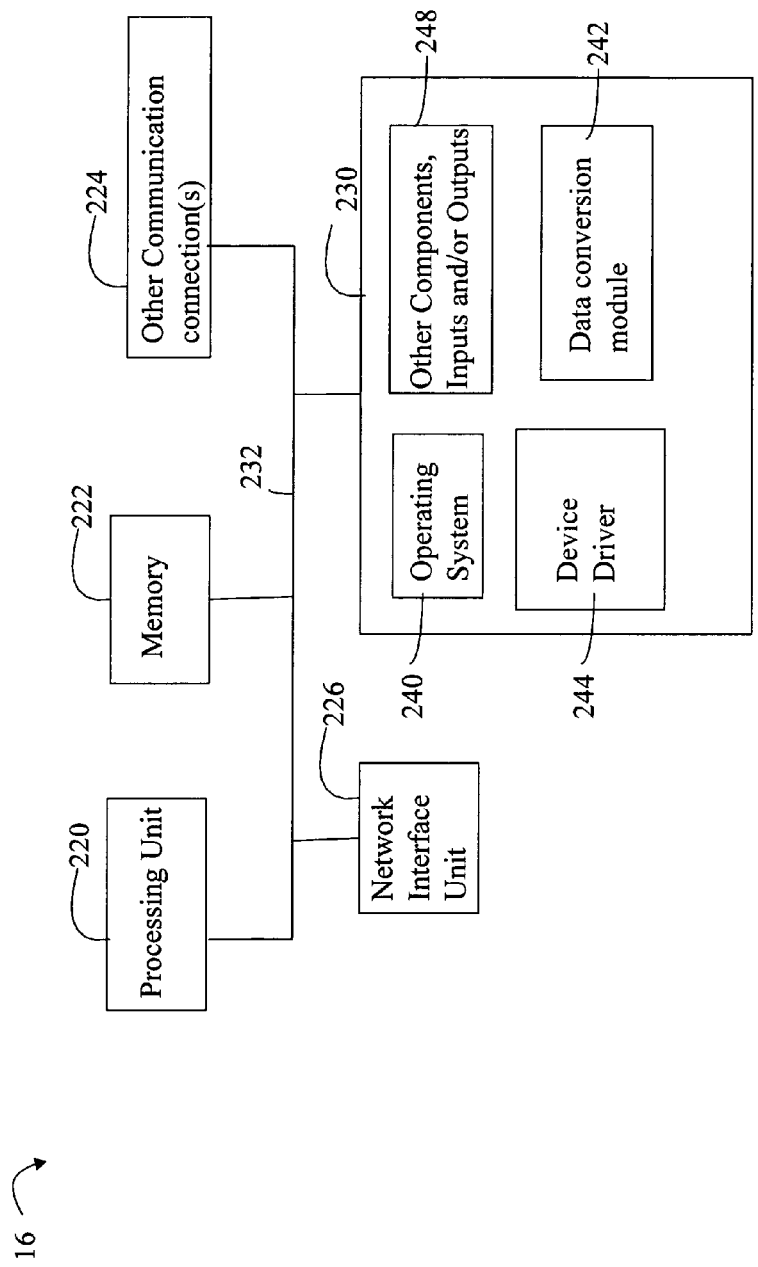
FIG. 4 is an example of an embodiment of components that may be included in a device server illustrated in FIG. 1 in connection with techniques described herein.

Referring now to FIG. 4, shown is an example of components that may be included in an embodiment of a device server 16, such as each of the device servers 16a-16b of FIG. 1. As illustrated in FIG. 4, an embodiment of the device server may include components similar to those as included in FIGS. 2 and 3. In one embodiment, the device server 16 may include one or more device driver modules 244 and one or more data conversion modules 242. As described herein, the device driver modules 244 may be used in connection with communicating with one of more of the devices 20a-20d of FIG. 1. The particular device drivers may vary with the particulars, such as the type and vendor, of each device. The data conversion modules 242 may be used in converting the data received in a first form used by the device driver to another form, such as a vendor-neutral XML representation.

Figure 5:
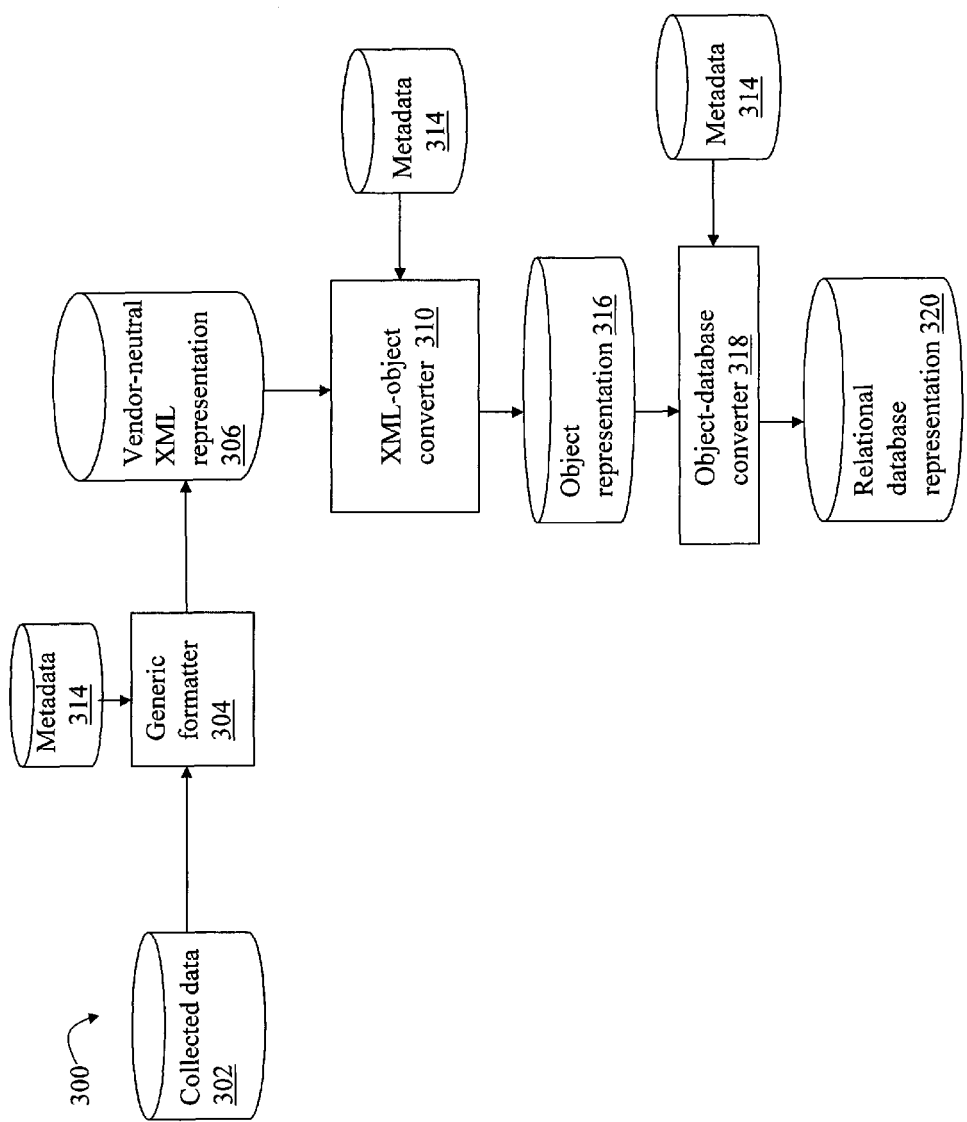
FIG. 5 is an example illustrating dataflow processing in an embodiment in connection with the techniques herein for storing configuration state information.
Figure 6:
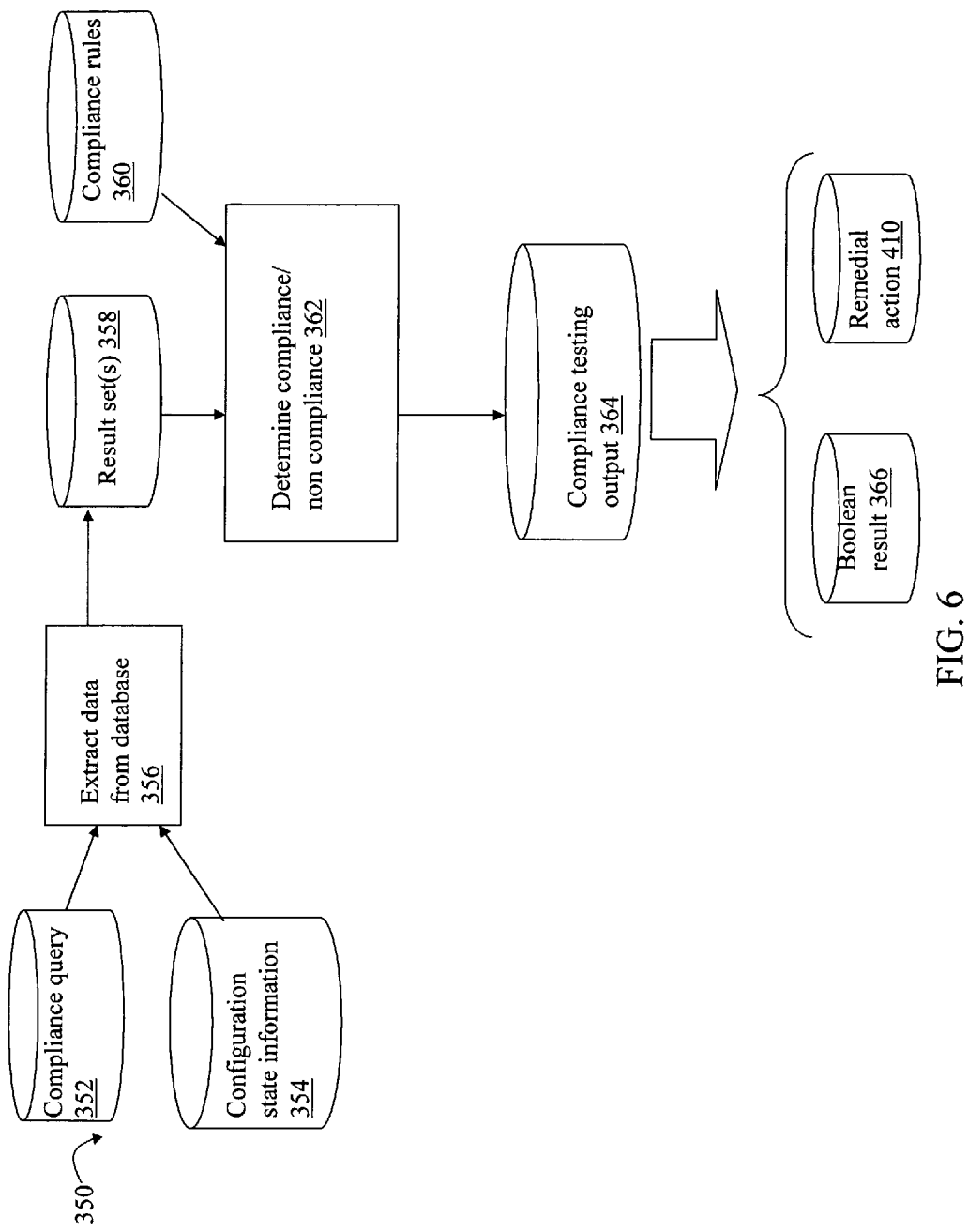
FIG. 6 is an example illustrating dataflow processing in an embodiment in connection with performing compliance testing.
Figure 7:
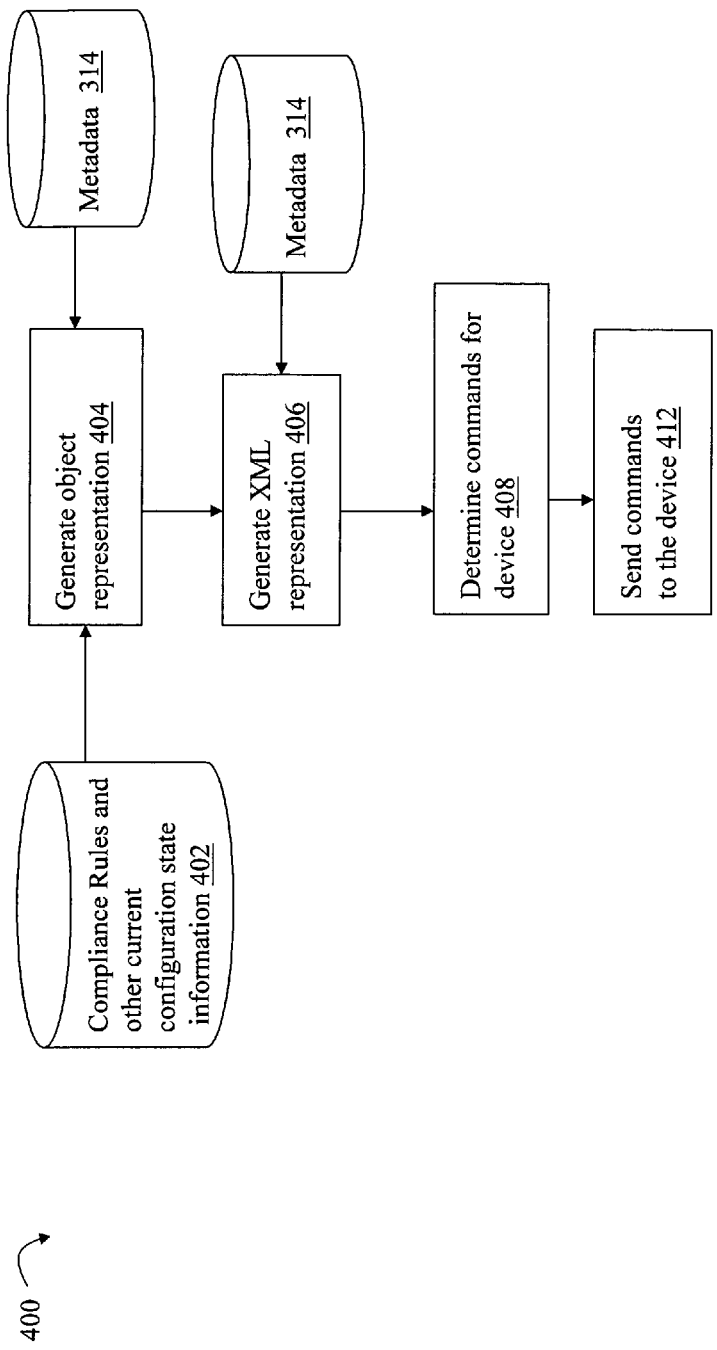
FIG. 7 is an example illustrating dataflow processing in an embodiment in connection with remedial action processing.

What will now be described in connection with FIGS. 5-7 is an overview of some processing steps and the associated dataflow that may be performed in connection with the techniques herein. It should be noted that additional detail regarding that which is initially presented in FIGS. 5-7 is described in following paragraphs.

Referring now to FIG. 5, shown is a diagram illustrating an exemplary data flow between various components that may be included in an embodiment utilizing the techniques herein for storing collected data. The example 300 includes collected data 302, such as the collected configuration state information received from a device by a device server. The collected data 302 may be converted into a vendor-neutral XML representation 306 by a generic formatter 304. The component 304 may be implemented using one or more of the data conversion modules, such as those included in the device server 16, and metadata 314. The XML representation 306 may be forwarded to an XML-object converter module 310 which converts the representation 306 to an object representation 316. As part of this processing, the module 310 may use metadata 314. The module 310 may be included in the application server which receives the data in form 306 from the device server(s). The object representation 316 may be converted to another form for use in connection with the data container. In one embodiment, the object representation 316 may be converted to a relational database representation 320 by an object-database converter module 318. The module 318 may be included in the application server.

As described in more detail elsewhere herein, the metadata 314 is data that describes other data. For example, the metadata may include information describing a structural relationship, such as a hierarchical relationship, between data elements in the object representation and the XML representation. The metadata may also include information regarding a mapping or translation from one representation to the other. For example, the metadata may indicate which elements in the object representation correspond to which elements in the XML representation, and which elements of the collected data 302 (e.g., having a form used by the device driver) correspond to elements in the XML representations 306. As such, the metadata 314 may be used in connection with translating the collected data 302 to an XML representation 306, translating the XML representation 306 to an equivalent object representation 316, translating the object representation 316 to an equivalent relational database representation 320, as well as other processing steps described herein.

It should be noted that the processing performed by component 304 to convert data to/from the XML representation 306 may also be performed by the application server rather than a device server.

The foregoing describes processing that may be used in connection with storing configuration state information in the relational database representation in a database. Other Information may also be stored in the relational database in connection with compliance testing techniques herein. In one embodiment, the compliance test may include one or more compliance queries and a set of one or more compliance rules. The compliance queries may be expressed as relational database queries and the compliance rules may be expressed in a tabular form. Both the compliance queries and rules may be stored in a relational form in the relational database. Additionally, it should be noted that the metadata utilized in connection with processing steps described herein may also be stored in the relational database.

Referring now to FIG. 6, shown is an example illustrating the dataflow in connection with retrieving configuration state information stored in the relational database and performing compliance testing using the retrieved information. The compliance query 352 may be used in connection with processing 356 to extract data from the database. In this example, one or more pieces of configuration state information 354 may be retrieved from the relational database. As a result of the extraction processing 356, one or more result sets 358 are formed. The result sets 358 may be stored as a representation in memory. The result sets 358 may also be stored in the relational database and retrieved for use in connection with processing 362 to determine compliance/non-compliance of thereof. Processing 362 may also use an input the compliance rules 360 to determine if the result sets 358 are compliant. As an output, step 362 processing may generate compliance testing output 364. In one embodiment, the outputs 364 may include a boolean result 366 indicating compliance (e.g., true) or non-compliance (e.g., false) with respect to the configuration data of a device tested in step 362. Elements 364 may also include one or more remedial actions 410 to be taken if the configuration state information for a device is determined to be non-compliant. As will be described herein, the remedial actions may take any one of a variety of different forms.

It should be noted that an embodiment may also include an option to output the one or more result sets 358. Such information may be useful, for example, when executing a compliance test as part of a debugging operation when constructing the system herein and also when making modifications to various components as described herein.

Referring now to FIG. 7, shown is an example representation of dataflow and processing that may be performed in an embodiment in connection with generation of the remedial actions 410. Processing step 404 may generate an object representation which includes an object representation with the corrected configuration state information. The object representation of step 404 may be include both corrected configuration state information, such as may be determined using the compliance rules of a non-compliant test, and current configuration state information, as may be obtained from an existing database table. For example, in one embodiment, remedial action processing may include generating an entire object for a device even if only a sub-object within the device includes non-compliant information. In constructing a device object for the remedial action, non-compliant portions of the device object may be replaced with correct information, such as may be determined using the failing compliant test. The foregoing non-compliant portions may be characterized as those changes to the database representation of the configuration state information which are necessary to make the existing configuration state information compliant. For example, a remedial action may be to change a data value of a parameter in a database table from a first integer (non-compliant value) to a second integer (which is the compliant value). The change may be indicated, for example, by the compliance rules. The remaining portions of the device object may already be compliant and may be retrieved from the database. The compliance rules and the current or existing configuration state information used to create the object representation in step 404 is represented by element 402.

In connection with forming the object representation 404 for the remedial action, metadata 314 may also be used. As will be described in more detail, the metadata 314 may be used, for example, to determine the structure and relationships between various objects of the object representation. The object representation including the corrected configuration state information may be converted in step 406 processing to an XML representation, such as the vendor neutral XML. Such conversion may be performed using mappings included in the metadata 314 as described elsewhere herein to map between object representation entities and corresponding XML entities. The XML representation may then be converted in step 408 to commands for the device. Step 408 processing may be performed on the device server. Processing steps for 404 and 406 may be performed on the application server. Once the commands are determined in step 408, the commands may be communicated to the non-compliant or failing device in step 412.

In one embodiment, the XML representation generated in step 406 may be temporarily stored in the database and then converted at a later point in time by the device server. For example, one or more XML representations may be stored in the database and the device server may generate the commands in step 408 for one or more XML representations of the remedial action.

It should be noted that the device commands may be automatically generated where possible, as described elsewhere herein in more detail. The remedial actions may include creating new required objects, deleting prohibited objects (e.g., sub objects that should not exist within an object under certain conditions), as well as updating an existing object and its attributes so as to be compliant with the compliance rules.

What will now be described is the object representation that may be used in an embodiment in connection with the techniques herein. The object representation 316 of configuration state information may be a hierarchical set of attributed objects.

Figure 8:
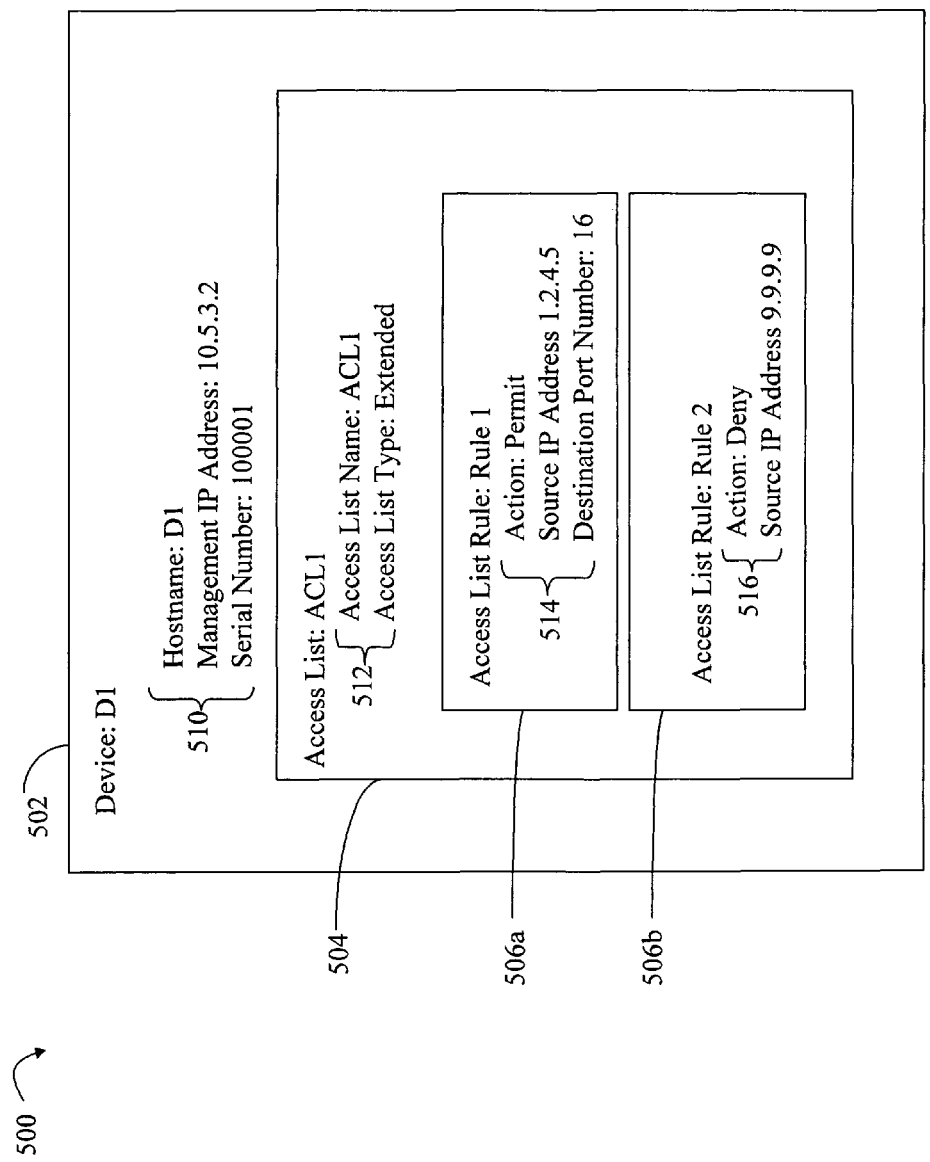
FIG. 8 is an example illustrating an object representation.

Referring now to FIG. 8, shown is an example object representation of configuration state information for a device. In the example 500, illustrated is an object representation of a device D1 502 that has attributes 510 including Hostname, Management IP Address, and Serial Number with the specific values of D1, 10.5.3.2, and 100001 respectively. In the illustration, a box (e.g., 502) represents an object, and the first line of text describes the object's type and name e.g., type: name like Device: D1. Each element included in the list (e.g., 510) immediately following represents an attribute of the object as defined by the attribute name and value pairings. Objects may contain other objects such as in a hierarchical object representation in the example 500 in which the object for device D1 contains Access List ACL1. The Access List ACL1 in turn contains Access List Rules Rule1 and Rule2.

It should be noted that the foregoing is only representative of the types of attributes that may be included in an embodiment for illustrating the techniques herein. It will be appreciated by those skilled in the art the configuration state information used in an actual implementation may represent a device with a single object that contains many more attributes and many additional embedded objects than as illustrated in the example 500. It should be noted that in connection with following paragraphs, elements in the object representation may also be referred to as the logical representation.

An object representation of the configuration state information as illustrated in the example 500 may be converted to other equivalent forms, such as an XML representation 306. An example XML representation will now be described.

Referring now to FIG. 9, shown is an example illustrating an XML representation 600 that may be used in an embodiment in connection with techniques herein. The example 600 includes an XML representation of the information illustrated in FIG. 8. The hierarchical representation of the different objects in the example object representation of FIG. 8 is reflected in corresponding hierarchical representation in XML.

Existing compliance testing techniques may express compliance rules or requirements and comparisons to be performed with the collected configuration state information in a source code representation. For example, the testing may be expressed as a set of regular expressions that should be matched, or as a series of steps in a sequential programming language such as Perl, TCL, and the like. As will be appreciated by those skilled in the art, the foregoing has disadvantages including, for example, the fact that such existing testing techniques require recoding, recompiling/retranslating, and the like of any source code if there is a modification to the configuration information format or compliancy requirements. Furthermore, the collected data format may vary for each device and/or type meaning that a different source code program may be written to take into account each such variation to be tested.

The techniques herein provide for expression and use of compliance tests which may be characterized as independent of the format of the configuration state information received from a device. The techniques herein may be used to author compliance tests which may be used in connection with different devices from a variety of manufacturers that do not have compatible formats for the raw collected data received from the various devices. Additionally, as described herein, remedial actions may be generated. The techniques herein may be used for automatic generation of remedial actions based on determining differences between the current configuration state information and the expected configuration state information of the compliance requirements.

As described herein, an embodiment may store the configurations state information for devices in relational database tables used in connection with a relational database.

Figure 10:
FIG. 10 is an example illustrating a database representation.

Referring now to FIG. 10, shown is an example relational database representation that may be used in connection with the techniques herein. The example 700 is an equivalent representation of the information previously described in connection with FIG. 8 (object representation) and FIG. 9 (vendor-neutral XML representation). The relational database tables of 700 are representative of tables and information that may be used in connection with the compliance testing techniques described herein. The example 700 includes a Device table 702 an AccessList table 704 and an AccessListRule table 706 in accordance with the different objects in the hierarchical representation of FIGS. 8 and 9.

It should be noted that in following paragraphs, the database representation may also be referred to as the physical representation.

Entries in one table are related to entries in another table using foreign key references. The foreign key references in the example 700 are designated by the columns with an asterisk (*). The AccessList column DeviceId is a foreign key reference to the Device Id column. The AccessListRule column AccessListId is a foreign key reference to the AccessList Id column. The foreign key references can be used to implement joins, combining values from multiple tables into a single result set. As such, the foreign keys facilitate indicating which elements of one database table relate to elements of another table. For example, the DeviceId of 1 in the example 700 indicates that the entry in table 702 having an Id of 1 is related to the corresponding row of table 704. The particular columns of the database tables which are foreign key references may be included in the metadata tables as described elsewhere herein.

As described herein in one embodiment, the compliance test may be defined using one or more compliance queries and a set of one or more compliance rules specifying compliance criteria. The compliance queries may be one or more relational database queries which are used to retrieve configuration state information from the relational database generating one or more result sets. A result set may be represented in a tabular form resulting from running a compliance query. In one embodiment, the queries may be expressed as SQL (Standard Query Language) queries. In one embodiment, a user may input data using a form. The data from the form may be converted to the SQL queries utilized in connection with compliance testing. The set of compliance rules may be used in connection with running a series of checks against the one or more result sets. For a device to be compliant, all compliance rule conditions must be met. The compliance rules may also be expressed in a tabular form. An embodiment may include several types of compliance rules. A first type may be those rules used to express that certain rows are required to be present in a result set table. A second type of rule may be those rules used to express that certain rows are required to be absent from the result set table. Additional compliance rule indicators may be used to specify that certain attribute values of every row in the result set are required to be the indicated values.

In one embodiment, each compliance query to be made may be input by a compliance test author using a query form. The query form may be retrieved by a user on a client system of FIG. 1 from the application server. The completed query forms may be persisted in a database or other data container in any one of a variety of different forms, such as the relational form of the relational database, or in another form, such as an XML form. If the completed query forms are persisted, they may be retrieved for use when performing compliance testing. The compliance query forms may contain variables or parameters which are not bound with a value until the compliance testing is actually performed.

Referring now to FIG. 11, shown is an example representation of a query form that may be used in connection with obtaining a compliance query. The example form 800 may include section 802 which lists all database tables used in connection with the illustrated query, a section 804 specifying filtering criteria, and a section 806 which specifies a ordering of rows in the result set. Section 806 may be an optional section in a query form and a default ordering for a result set may be otherwise utilized. In this example section 804 specifies the filtering criteria as various column selections of database tables. As described in more detail below, the filtering criteria of section 804 evaluates to true for a potential row in the result set when the equations of section 804 are satisfied.

Section 802 includes a list of all database tables involved in the query. For each table in the first column 810 of section 802, a table alias is indicated in the second column 812. In this embodiment, the table alias is a user-defined variable used to refer to the table in connection with this compliance query and associated compliance rules. The third column 814 of section 802 may include a Join On clause indicates how subsequent tables should be joined in the query to the first listed table. Column 816 of section 802 may include an optional Include Null boolean indicator that indicates the resulting joined object cannot be null. It should be noted that the table aliases, along with the other information in the query form in the example 800, may be persisted in the database. Table aliases may be referenced by the user, for example, when forming the compliance queries as indicated in FIG. 11 and also in forming the compliance rules. The user-defined table alias variables have a scope associated with the compliance test.

In one embodiment, table aliases are used in the column designations of both the compliance query and compliance rules in order to avoid ambiguity in the instance where there may be two objects of the same type involved in the same compliance query. As illustrated in one embodiment herein, the column designation may have the form tablealias.columnName where "columnName" references a database table column name. However, an embodiment may also allow a user to specify a database table name or a corresponding object name rather than a table alias if there is no ambiguity.

Section 804 includes a list of selections which select various rows from the resulting joins indicated by section 802. Each selection may include a selection column designation 820 that names a database table column using the table alias and column name. In 820, this is included in the format "table alias. database table column name". Each row in section 804 may also include a selection operator 822 indicating one of a variety of different operators that may be included in an embodiment such as, for example, =, < >, <, >, >=, and <=. An embodiment may also include operators providing support for regular expressions. As known in the art, a regular expression may specify a formal notation for defining a pattern describing a set of one or more strings. In one embodiment, operations for regular expression matching may take the form of a binary operation resulting in a boolean value. The form may be STRING <OP> EXPRESSION. STRING may be a literal, string variable or other argument specifying a string value. EXPRESSION may be notation describing a regular expression string pattern using any syntax and notation to describe a regular expression. The <OP> may represent one of a set of defined different matching operations (e.g., STRING "matches" the regular expression EXPRESSION or "does not match" the regular expression EXPRESSION). The regular expression matching operation may apply the designated operator and make a determination with respect to the STRING and EXPRESSION arguments. For example, if the <OP> is "IS", processing may be performed to determine whether the STRING is represented by the regular expression EXPRESSION. An embodiment may utilize any one or more different symbols or text strings to indicate the one or more different operators.

Each row of section 804 may also include a selection match expression 824 indicating the compliance query selection criteria. In one embodiment, the contents of column 824 may be a literal such as illustrated, an expression, a variable reference, or another table column designation. In connection with forming a compliance query, the field 820 may indicate the configuration state information of collected information to be retrieved from the database which is compared, using the selection operator 822, to the element indicated in field 824. The filtering criteria of section 804 filters the results of the join operations so that only selected rows appear in the result sets.

Section 806 is an optional "Order By" section that contains a list of database table columns using the alias and column name in 830. The contents of 830 may be used to specify an ordering of rows in the result set. Column 832 may be an optionally specified boolean indicator which is set to indicate that the ordering is descending with respect to the column indicated by 830. If no indicator in 832 is specified, the ordering of the result set may be ascending.

It should be noted that a compliance query may be specified using the query form as illustrated in FIG. 11. An embodiment may allow selection of a defined query from a library, catalogue, or other query storage location. In this latter instance, a user may define one or more queries which are stored in the query storage location. At a later point, a user may select one or more of the queries included in the query storage location for use in connection with a compliance test. Selection of one or more queries for use with a compliance test may be made using any one of a variety of different techniques including, for example, interactive selection of defined queries from a list displayed in a menu, manual entry of a name associated with a query identifier associated with a particular query, and the like.

If the query form is completed as specified in FIG. 11, an SQL query may be constructed. As will be appreciated by those skilled in the art, the SQL query formation is straight forward. The tables section 802 is used to construct the "FROM" and "JOIN" clauses in the query. The selection columns section 804 is used to construct the "WHERE" clauses of the query. The optional section 806 may be used to construct "ORDER BY" clauses. The example query in the form illustrated in FIG. 11 may be translated to the following SQL statement:

SELECT * FROM Device d1 LEFT JOIN AccessList a1
ON a1.DeviceId=d1.Id LEFT JOIN AccessListRule r1
ON r1.AccessListId=a1.Id ORDER BY r1.Id It should be noted that the "Include Null" designation is described elsewhere herein in connection with processing for the compliance testing when explicitly specifying JOINs in the compliance query. As described in more detail elsewhere herein, the processing associated with the "Include Null" designation may be characterized as a LEFT JOIN operation. As an example, if D1 is JOINed with A1, setting the Include Null designation causes a row to be generated in the result set for every row in the table designated by D1, even if there is no corresponding entry as specified by the join in the table designated by A1. In other words, setting "Include Null" means to include rows in the result set for which the object described in this join clause is null.

An embodiment of a query form may also include another optional fourth section used to select a list of database table columns to be retrieved in the query (e.g., corresponding to the SQL SELECT clause). It should be noted that the fourth section may be optional because the particular columns that should be retrieved from the database in connection with the query for compliance testing may be determined using other sections of the query form, the compliance rules and metadata described elsewhere herein.

In an embodiment, a compliance test using the query form or other technique may utilize logical object type names referring to objects in the object representation rather than the actual database table names when specifying the compliance query and compliance rules. For example, the query form may use names of objects in an object representation. The object names may correspond to the database table names in section 802 of FIG. 11. It should be noted that the logical object names may not be the same names as used for the database tables. In fact, it is possible that an object may be represented in the database using multiple tables that must be joined together.

Similarly, the names for the database table fields or database table columns used by the compliance testing author when specifying the compliance queries and compliance rules may reference logical Attribute names as included in the object representation that may be mapped, for example, utilizing metadata, to an underlying physical database column names. The use of logical names as included in an object representation for objects and their attributes provides a layer of insulation in the event of a database schema change. The physical tables or columns used by the database may then change without invalidating a compliance test so long as the logical names as included in the object representation for the objects and attributes remain constant. The foregoing mapping or translation between object representation or model and database representation or model may utilize the metadata as described elsewhere herein in more detail. This mapping as expressed using the metadata is accordingly updated if there are changes to the database schema.

The metadata may also be used in an embodiment to provide other useful information about the attributes of an object, including the type of the attribute (e.g. string, integer, long, boolean, Internet address, date, etc.), and identify which attributes are keys in the database. A database key is a unique identifier within a database table that names one unique row. As known in the art, keys are often used to lookup rows (representing objects) within a database table, as well as to create references from one table to another, such as with using the foreign key references as described elsewhere herein in connection with performing database table JOINs.

The compliance queries in SQL form are executed by the database as part of the compliance testing and the corresponding one or more result sets may be retained for use in subsequent processing steps.

Referring now to FIG. 12, shown is an example representation 900 of a result set for the query corresponding that as specified in the example 800 of FIG. 11. Result sets may be represented in a tabular form with columns corresponding to each of the selected database table columns in the query and rows representing the data values retrieved from the database for the configuration state information. Note the rows of the results in the example 900 may contain values from multiple tables, joined, selected, and ordered according to the rules of the SQL query.

In one embodiment, there may be three different types of compliance rules: "Must Contain" rules, "Must Not Contain" rules, and "Match Each Row" rules. Must Contain rules may be expressed in a table similar to the form of the result set with headings corresponding to database table columns appearing in the result set, and rows representing combinations of values that the result set must contain.

Referring now to FIG. 13, shown is an example representation of a Must Contain table used in connection with compliance testing with the techniques herein. The compliance test author designates both the column headings for 1002 and 1004 as well as the particular data values included in portion 1010 of the table in the example 1000.

The column headings for 1002 and 1004 may be specified as a combination of the table alias name and the corresponding logical name as included in the object representation. When the conditions indicated in table 1000 are applied to the result set indicated in FIG. 12, the compliance testing indicates a pass or compliant result because for each Must Contain condition row of the table 1000, there exists a corresponding row in the result set of FIG. 12 having values matching those values of the specified columns in the table 1000.

With reference to the example 1000, the first row includes a value in 1002 of 9.9.9.9 and a null value or no value in 1004. This indicates that a row in the result set containing the value of 9.9.9.9 for the column designated by 1002 and that same row in the result set may have any value for the column designated by 1004 since a value is not specified.

In connection with specifying the compliance Must Contain rules, additional information may also be specified by the compliance test author. A "Replicate On" designation may be used to indicate if the Must Contain rules should be applied to each instance of a designated item in the result set. For example, the result set of FIG. 12 includes only one Access List, and Must Contain processing checks Access List Rules that belong to that single Access List. If the result set contains multiple Access Lists, it may be useful to apply the Must Contain checks specified in the compliance rule to each occurrence of Access List in each row of the result set. The foregoing may be specified by designating Replicate On with a particular table alias that indicates whether or not the rules are to be replicated on each instance of a particular object. In one embodiment, a result set may include one or more rows and each row may be formed to include at most a single instance of the Replicate On object. With reference to the example of FIG. 12, the different occurrences of AccessList may appear in different rows and may be accessed by the AccessListId. In the embodiment herein, the Replicate On designation is performed with respect to changes in the designated key value. This is illustrated further in connection with FIG. 16. An embodiment may also include an "Ordered" boolean indicator, which, when true, indicates each of the Must Contain rules must appear in the same order as a corresponding match in the result set. An embodiment may also utilize an "Exact Match" boolean indicator which, when true, indicates that the result set must not contain any additional rows other than those matched by a row in the Must Contain rules. The foregoing are described in more detail elsewhere herein.

The Must Not Contain compliance rules may be specified in a manner and form similar to the Must Contain rules. Each row in the Must Not Contain tables represents a set of values that must not appear in the result set in order for that result set to be deemed compliant. For each row in the Must Not Contain table, no row may appear in the result set that matches all the non-null values in the Must Not Contain row.

Referring now to FIG. 14, shown is an example representation of a Must Not Contain table of compliance rules. The Must Not Contain table in the example 1100 causes a failure for compliance testing using the result set of FIG. 12 because a row matching the specified Access List Rule SourceIpAddress and DestinationPortNumber does appear in the Result Set (e.g., see first row of result set in FIG. 12).

The third type of compliance rule that may be specified in an embodiment is the Match Each Row rule.

Referring now to FIG. 15, shown is an example representation of Match Each Row rules. Rules of this third type may be specified as a set of boolean equations that must be true in order for the compliance condition to pass. The individual equations each represented by a row in the table may be logically ANDed or ORed together as indicated in column 1152 to form a combined, single equation. Each equation specified by a row may be in the form of a database column indicated in 1154 (specified as a database Table alias combined with a logical Column name in the object representation), an operator 156 (e.g. =, < >, <, >, <=, >=, regular expression operators, and the like) and a comparison field 1158. The field 1158 may be, for example, a literal value, variable reference, complex expression, or another query column designation. Each Match Each Row rules is applied against each row in the result set. It should be noted that an embodiment may allow a user to specify an order of evaluation of expressions in row groupings by preceding the row grouping with a first row including a left parenthesis "(" in column 1156 and following the row grouping with another row including a right parenthesis ")" in column 1156. In other words, the rows in the table to be grouped are marked with two additional rows in the table—a first row before the group of rows and a second row following the group of rows. The first row includes the "(" as the operator, and the second following row includes the ")" as the operator. The boolean expressions for the equations are combined using the boolean AND or OR functions as indicated in the column 1152 to form a compound boolean equation including a boolean equation formed using each row of the table 1150. The compound boolean equation may generate a single boolean result which evaluates to true for the row to be compliant. The Match Each Row rules may be specified in a form similar to the query selection fields in section 804 of FIG. 11 with the additional column 1152. It should be noted that an embodiment may also include the AND and OR operators illustrated in column 1152 of FIG. 15 with the expressions used in section 804 of the compliance query form 800 in FIG. 11, In other words, section 804 may also include a column similar to 1152 for use in forming the expressions therein.

Referring now to FIG. 16, shown is an example of a set of compliance rules of the foregoing three types as may be specified using a single form. The example 1200 includes Must Contain Rules 1202, Must Not Contain rules 1204 and Match Each Row rules 1206. It should be noted that an embodiment may utilize any one or more of the foregoing in connection with specifying a compliance test. The example 1200 may be specified using a single form in a user interface in which a compliance test author creates a compliance test. The example 1200 includes the Must Contain rules from FIG. 13 with the additional Replicate On indicator which indicates that the rules are to be replicated on each AccessList a1. In this example, a1 is the table alias for the Access List table. The Must Contain entries of 1202 must be matched in Order as indicated by the boolean indicator with the entries for the Access List in the Result Set (since Ordered is designated) for the Compliance Test to pass. Other entries or rows may appear in the result set since "Exact Match" is not designated. The example form 1200 includes a Must Not Contain entry in 1204 for r1.SourceIpAddress equal to 10.11.12.13. If the foregoing value is found in the result set, the compliance test fails. The Match Each Row designation in section 1206 specifies that every row in the result set must have an AccessList Name of ACL1 and a Type of Extended.

In many instances, if a compliance test fails, it is possible to automatically construct a proposed remedial action. In one embodiment, the compliance test author can enable or disable individually the application of any of the following rules built into the compliance testing processing to generate a proposed remedy. As described elsewhere herein, the remedial actions may be applied automatically or scheduled for application in accordance with various configuration settings that may be included in an embodiment. In connection with remedial action generation:

1. If an entry in the Must Contain table is not satisfied for a particular result set or portion thereof as may be designated by the Replicate On field, an instruction is generated to add new object(s) containing the required attributes to the device or other object to which the compliance test is applied.

2. If an entry in the Must Not Contain table is not satisfied because there is a matching entry in the result set, or portion thereof as designated by the Replicate On field, an instruction is generated to delete the matching object(s) from the device or other object to which the compliance test is applied.

3. If a Match Each Row expression is not satisfied, and the Match Operator is equals, an update instruction may be generated to change the object's attribute as named by the Match Column to the value resulting from computation of the Match Expression. It should be noted that, as described elsewhere herein, depending on the particular expression, it may be possible to generate a remedial action depending on the Match Operator 1156. For example, if the operator is "=", a remedial action can be generated to correct the configuration state to be "=". However, if the operator, for example, is ">=" or "!=", more than one value may correspond to a "corrected" configuration state. As such, an embodiment may not generate a remedial action since more than one value may qualify to correct the configuration state to a compliant state. This is described in more detail elsewhere herein.

The remedial operations may be transmitted to the device server for communication to the device in various forms. For example, the remedial actions may be transmitted to the device server for transmission to the device as a list of instructions for adding new objects, deleting undesired objects, or changing attributes as described above. The foregoing allows the device server to change only those portions of an object that need alteration. Alternatively, a remedial action may be transmitted as a complete replacement object or redefinition including, for example, a complete replacement object with its attributes and any embedded objects specified. This latter complete replacement may allow the device server to discard the incorrect object and instantiate a new replacement object. In this latter technique, commands communicated to the device by the device server may redefine or reconfigure the entire device as opposed to partial reconfiguration of only those non-compliant portions. As described in connection with FIG. 7, the remedial actions may be formed as a result of one or more translations to arrive at the device commands utilized so that all portions of the configuration data of the non-compliant device are appropriately reconfigured.

The compliance testing processing will now be described in additional detail in furtherance of the description previously set forth elsewhere herein, for example, in connection with FIG. 6. The processing steps for the compliance testing processing may be initiated and controlled from a driver code portion or module written in any one of a variety of different programming or scripting languages as may be utilized in connection with an embodiment. In following paragraphs, the compliance test techniques may be outlined as a series of steps. These steps are followed in order to implement the compliance test. The result of execution of these steps is a boolean indicating whether the compliance test has passed or failed, and may optionally include a set of remedial actions if the test fails.

The compliance test to be executed is retrieved from permanent storage such as, for example, from the relational database if the compliance query and rules are stored therein. As described herein, compliance testing may be performed upon operator request or when an event related to a device or the network occurs. The test is provided with a starting database table as may be specified in the first table row on the initial compliance query. The foregoing must match the type of initial object the test is to be executed against. The particular object the test is to be run against is supplied by a unique identifier to the compliance testing. The particular object may be identified, for example, by an Id field in the initial table. For example, the first object to be tested may be a device and the device's corresponding Id as indicated in table 702 of FIG. 10 may be specified as the starting object for compliance testing. As described herein, the following are inputs that may be used in connection with compliance testing processing:

1. The compliance test specification, including the compliance query and compliance rules.

2. The metadata which is used to translate the logical Object and Attribute names of the object representation to the physical table and column names as may be included in database tables. The metadata may also be used to obtain type information about each attribute and other information for use in connection with performing data validation processing.

3. The relational database contents which includes the configuration and state information that has been persisted about each managed device 4. An initial object for the compliance test, which is designated by the Object type name as in the object representation and a unique identifier (or database key) for the object.

The compliance testing processing as may be coded in a driver program or module as described above may control processing.

Figure 17:
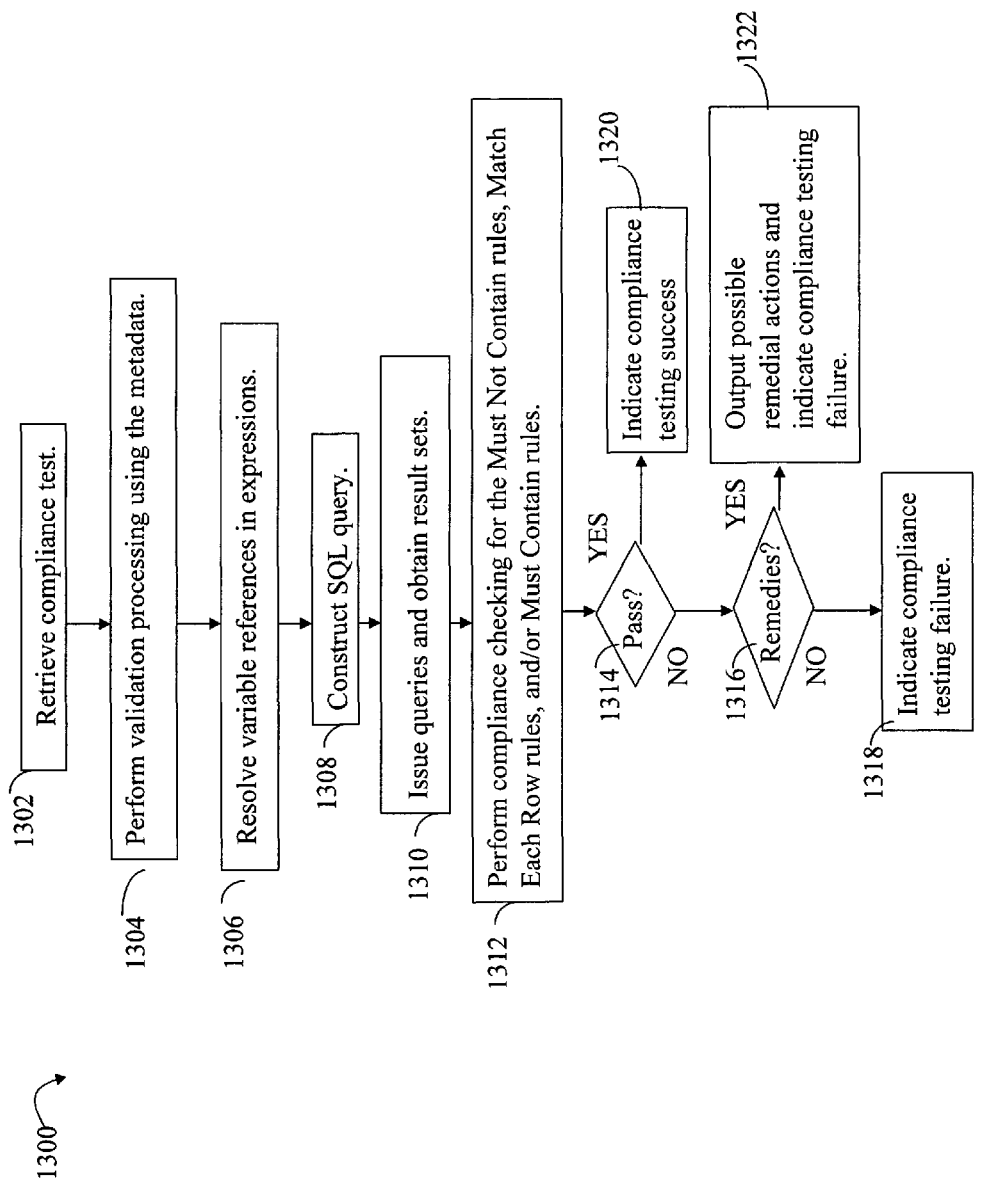
FIGS. 17 and 17A are flowcharts of processing steps that may be performed in an embodiment in connection with performing compliance testing techniques as described herein.

Referring now to FIG. 17, shown is a flowchart of processing steps that may be performed in connection with compliance testing processing. The steps of flowchart 1300 may be coded as described above, for example, in a driver program or module. At step 1302, the compliance test to be executed is retrieved from storage such as, for example, the relational database or other data container. In step 1304, validation processing of the compliance test, including the compliance query and compliance rules. The contents of the compliance test are validated against the metadata. For example, all the object and attribute names that may be included in the compliance query and compliance rules may be checked for reference in the metadata to ensure the compliance test is properly formed. If this validation fails, the compliance test cannot be run. As described in more detail herein, the metadata may include object and attribute names and other information regarding objects of the object representation. In step 1306, variables referenced in the compliance query or compliance rules are resolved with their actual values from the contextual state of the network and device at the time the test is executed. This is done by taking the variable name specified in the test and looking up the value in the database table that maps variable names to their values. The value for the variable is then used in connection with the compliance testing processing. As described herein, variables may be utilized in expressions such as selection match expressions which are now resolved. It should be noted that step 1306 may be performed after step 1310 if an embodiment provides for variable references within expressions in which the variable references have values determined based on query results. For example, an embodiment may allow a user to include a variable in an expression in which the variable represents the size or number of entries in a result set. As such, depending on the extent of variable support provided in an embodiment, step 306 may be performed at different processing points.

At step 1308, an SQL query is constructed for each compliance query specified as part of the compliance test. Multiple compliance queries may be included in the same test provided that each has a unique set of table aliases. Step 1308 processing may include performing several sub-steps that may be summarized as follows:

i. The logical object names of the object representation are translated to their physical database table name(s) by looking up the translation in the metadata. If an object is constructed from multiple database tables, additional joins are added to the query to retrieve the required database rows. This operation is described in more detail in connection with the different types of metadata tables that may be included in an embodiment (e.g., the Metadata (MDT) table and fields such as the "join1 . . . join4" field described elsewhere herein).

ii. The columns to be retrieved from the database in connection with the queries are determined automatically, and include: data corresponding to attribute names within the compliance query forms or compliance rules that are referenced via the table alias and column designations. The physical column names of the database tables may be determined for the foregoing by consulting the meta data. The data retrieved from the database may also include those fields corresponding to foreign key references required to complete the query as may also be determined using the metadata. (e.g., the Metadata Navigation (MDN) table described elsewhere herein). The data retrieved from the database may also include data from other database columns as identified by the metadata that are not referenced in the test specification which may be included to facilitate application of any generated remedial actions. The queries may be denoted Q1 to Qn and any arbitrary Query is designated Qx.

iii. A textual representation of the query is constructed by specifying the SELECT clauses containing each column to be retrieved, followed by one or more JOIN clauses (specified from the objects or tables listed in the query form(s)), followed by the WHERE clauses as specified in the selection criteria of the query form. As will be appreciated by those skilled in the art, the foregoing is performed in accordance with the rules for specifying an SQL query.

In step 1310, each of the textual SQL queries formed in step 1308 is executed by passing the textual SQL query to a database system. Corresponding query results are saved as a result set. In connection with techniques herein, result sets may be numbered in accordance with corresponding compliance queries from 1 to n. In connection with description in following paragraphs, the result sets may be designated RS1 to RSn and any arbitrary result set may be designated RSx.

Figure 17A:
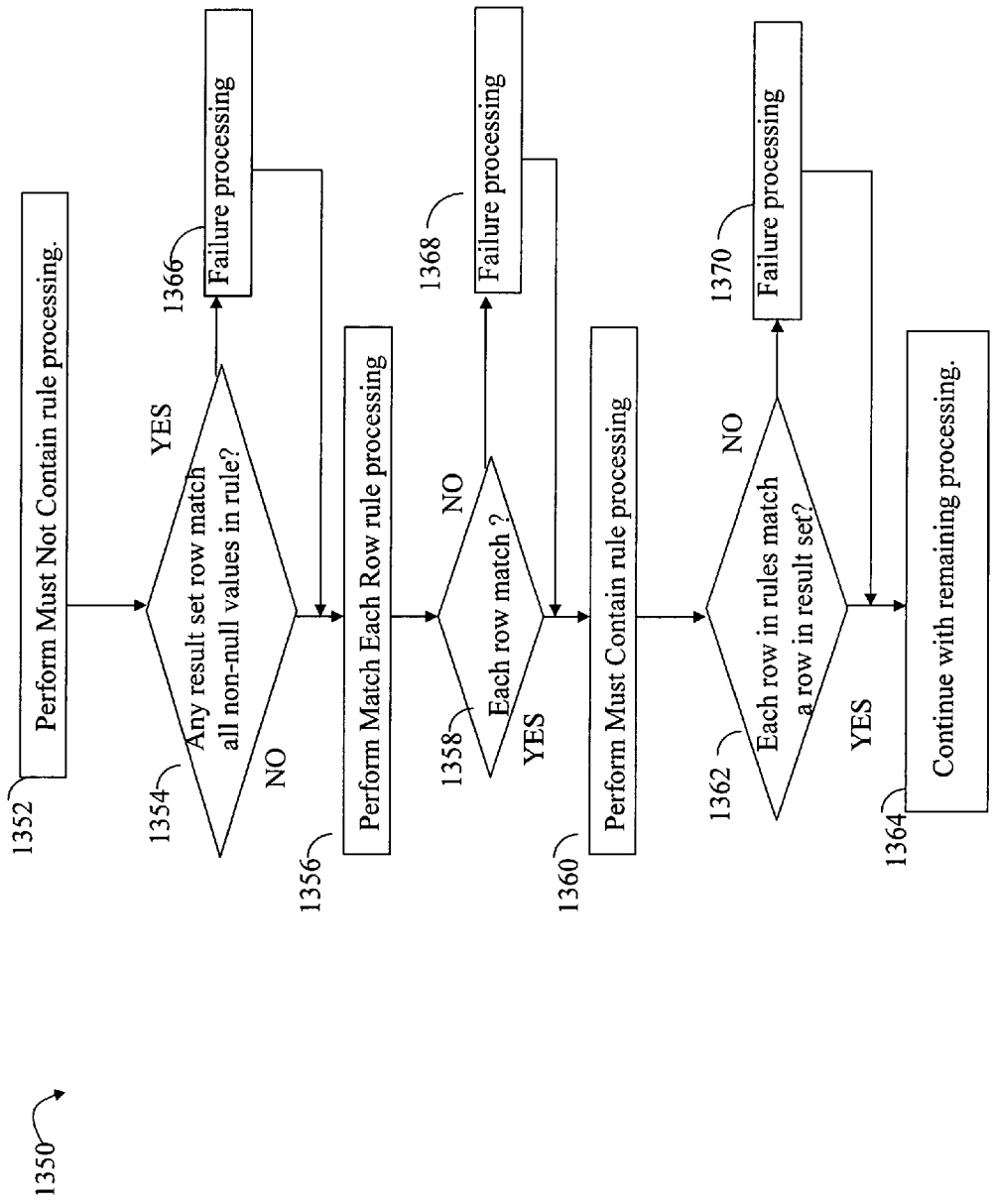

In step 1312, compliance checking is performed for the one or more compliance rules. As described herein, an embodiment may utilize any one or more of three types of rules and processing is performed in connection with all rules of each type. Additional detail regarding step 1312 that may be performed in an embodiment is shown in FIG. 17A. Must Not Contain rule processing is performed in step 1352. For each row in the Must Not Contain rules, a check is performed as indicated in step 1354 to see if any row in a result set RSx matches all the non-null values in the rule. If so, control proceeds to step 1366 to perform test failure processing. An optional remedial operation can be generated. In one embodiment, a remedial action can be generated to delete the smallest Object tree that contains all non-null columns in the Must Not Contain rule. In other words, the non-compliant data is removed from the configuration state information by accordingly configuring the device to remove the information. For example if the Must Not Contain rule identifies only columns in an AccessListRule, only that rule is deleted as opposed to deleting the AccessList in which the AccessListRule is contained. Any rows in RSx that match a Must Not Contain rules (e.g., causing test FAIL) are deleted. From step 1366, control proceeds to step 1356 to perform Match Each Row rule processing. If step 1354 evaluates to no, control proceeds directly to step 1356.

In connection with step 1356 processing, each equation in the Match Each Row rules is evaluated in connection with each row in the result set containing the table column identified by the "match column" specification. For example, if a row's match column has a table alias of x1, then each row of the result set RSx that contains the table designated by x1 is checked against the specified equation. The check may be performed, as indicated in step 1358, by comparing the result set value retrieved using the match column information against the match value (e.g., as designated by the match expression field) using the operator (e.g., as designated in the match operator field) in the rule. The match column's type is determined from the metadata and used to determine the allowable operators and match values. For example, validation processing may be performed to not allow use of a less than operator ('<') with a boolean value, but to allow such an operator for use with integer values. Similarly, string values can be checked against regular expression strings defined using the regular expression operators. However, use of the foregoing regular expression operators is not valid for other types. If multiple equations are specified in the MatchEachRow rules, the results of evaluating each rule for a specific row are combined according the logical operators AND and OR as specified in the compliance rules. If combined boolean values evaluate to false, the test FAILS. If step 1358 determines that Match Each Row rule processing has failed, control proceeds to step 1368 to perform test failure processing.

As part of step 1368, an optional remedy can be generated if a failing rule's operator is equals (=). The remedial action can cause an update to be made to the object's attribute value corresponding to the column to the value specified in the Match Expression. If a rule's operator is "not equal to", then multiple values may satisfy the rule so it is not possible to uniquely determine what value the object's attribute should be set to make the device compliance. Consequently a remedy cannot be automatically generated. If one or more remedies are generated, processing may be performed to generate device instructions to reflect the result of applying the remedy. From step 1368, control proceeds to step 1360. If step 1358 evaluates to yes so that Match Each Row rule processing is successful, control proceeds directly to step 1360.

In connection with step 1360 processing, each row in the Must Contain rules is checked against the result set RSx containing the indicated columns. As indicated in step 1362, each row in the Must Contain rules table must match a row in RSx for each non-null column value in the rule. If the optional Ordered qualifier is specified, the rules in the Must Contain table must be matched in order. If the optional Exact Match qualifier is specified, the result set RSx may have no additional rows other than those matching a Must Contain rule. If there is a row in the rules with no corresponding result set match, the test FAILS and control proceeds to step 1370. As part of step 1370, an optional remedy can be generated to add a new row to the relational database representation comprised of values set to the non-null values specified in the Must Contain row. The new entries that are generated express the new values contained in the Must Contain rule. If there are additional rows in the case that the Exact Match qualifier was specified, then a remedy can be generated that will delete the additional rows. From step 1370, control proceeds to step 1364 to continue with subsequent processing. Step 1364 indicates to continue processing with step 1314 of FIG. 17. If step 1362 evaluates to yes indicated that Must Contain rule processing has been successful, control proceeds directly to step 1364 to continue with subsequent processing steps.

Returning to FIG. 17, once the compliance rules are checked with respect to the result sets in step 1312, control proceeds to step 1314 where a determination is made as to whether compliance testing has been successful. In one embodiment, compliance checking may be deemed successful if none of the compliance tests checked in connection with step 1312 processing identified a test failure condition. If no failures are identified, step 1314 evaluates to yes and control proceeds to step 1320 to output results indicating compliance testing success. If step 1314 evaluates to no indicating failure of one or more compliance tests, control proceeds to step 1316 where a determination is made as to whether remedies are to be output. If step 1316 evaluates to yes, control proceeds to step 1322 to output an indicator that compliance testing has failed and also output any generated remedial actions. If step 1322 evaluates to no, control proceeds to step 1318 where an indicator regarding compliance test failure is output without remedial actions.

In one embodiment as described herein, the processing of flowchart 1300 may generate a boolean true value indicating the configuration state information associated with the initial object checked is compliant, or false value indicating the configuration state information (and thus the corresponding device) is not compliant. The remedial actions may be optionally generated for application to the device in order to make the device's configuration state in compliance with the current compliance test retrieved at step 1302.

In connection with step 1310 processing to obtain query result sets, a JOIN clause may be included in the compliance query to concatenate information from different database tables when forming a data set for the query. The INCLUDE NULL field 816 of FIG. 11 may be used to affect the result set in accordance with whether there is any information actually JOINed from other database tables. If a second object (e.g., access list) is JOINED with a first object (e.g., device) and the second object is null or non-existent, setting the INCLUDE NULL indicator (e.g., =1) causes the first object to be included in the result set. Otherwise, if the INCLUDE NULL indicator is not set (e.g., =0) and the second object is null, the device is not included in the result set. In other words, the INCLUDE NULL indicator when set (e.g., =1) may be used to force a first element, which is JOINED with a null or non-existent instance from another database table, to be included in the result set. The foregoing may be useful, for example, when writing a compliance test to flag as non-compliant those fields which are null and should have values defined. For example, the INCLUDE NULL indicator may be set when writing a compliance test to ensure that every device has an access list if every device is required to have an access list. As another contrasting example, the access list may be optionally defined for a device. However, if there is an access list, the access list must conform to certain conditions tested for in a compliance test. In this latter contrasting example, the INCLUDE NULL indicator 816 of FIG. 11 may be set off (e.g., =0) so that the device is included in the result set only if there is an access list. Only if there is an access list do we want to determine whether the access list is compliant.

One problem that occurs when using an one or more representations in connection with compliance testing and the configuration state information representations is how to add new information to the configuration state information in an efficient manner. It may be desirable to be able to perform modifications to the configuration state information while minimizing or eliminating modifications to existing code, such as changes to the driver program. It may also be desirable to be able to customize the configuration state information in one or more of the different representations that may be utilized in an embodiment. Such customizations may be performed, for example, to incorporate additional modifications to configuration state information that may occur over time, import existing configuration state information having a different format and/or model such as produced using a legacy system for use with the techniques herein, and the like. The configuration state information may be gathered from the devices themselves as described herein. Additionally, the configuration state information may be obtained from other external network management or operational monitoring systems. Using the metadata to describe the configuration state information, the metadata may be easily modified in a variety of different ways in order to facilitate the foregoing. These and other uses of the metadata as described herein will be appreciated by those skilled in the art.

In an embodiment, the metadata may be stored in a database, such as the relational database described herein. In connection with the techniques herein, the metadata may be updated to facilitate the modifications to the configuration state information so that the metadata may be updated independent of other components, such as without updating the code of the driver program, data associated with the compliance tests, and the like. As described herein, the metadata describes various aspects of the configuration state information that is modeled in the one or more representations described herein. For example, the metadata describes the elements of the configuration state information in each of the different representations, the organization or structure of the configuration state information, the mapping between various elements of each of the different representations, and the like.

In one embodiment, the metadata may describe the following about the object representation (e.g., attributed compliance data representation such as illustrated in FIG. 8:

1. The logical names of objects (e.g., names in the object representation) and physical names and properties (e.g., names in the physical database representation). Each type of object is represented by a separate table in the database. Information about the objects and their database table representation may be stored in a MetaDataTable (MDT) table which is described below in more detail.

2. The logical and physical names, types, and properties of each attribute associated with an object may be expressed by an entry in a MetaData Column (MDC) table described elsewhere herein in more detail. The properties of each attribute may include information on how the attribute is represented in the database and identify which attributes are database keys, the type of the attribute, how the attribute is represented in communications between the device driver and application server, and how the attribute is to be collected from the device. In one embodiment, the foregoing information may be stored in a second metadata table, the MDC table. As an example, an embodiment may include a database table of devices for which configuration state information is maintained. The database table of devices may include an entry or row for each device. Each attribute of a device may appear as a column in the database table of devices. The object representation may include a corresponding device object. The database table of devices includes instances of the device object. The database table of devices may have a corresponding entry in the MDT table. An entry may exist in the MDC table describing each device attribute (e.g. for each column in the database table of devices).

3. Information about the relationships between objects is stored in the MetaDataNavigation (MDN) table. It contains information on the foreign key relationships between tables, and the type of relationship being expressed such as, for example, an object of one type contains objects of another type, or an object of one type is contained in an object of another type. The foregoing may be used to assist the user in filling out the query form, for example. The MDN is described in more detail below.

4. Information about which database columns should be displayed by a user interface may be stored in the MetaDataProjection (MDP) table as described in more detail below.

An illustrative exemplary schema of the metadata that may be utilized in an embodiment is described below. The following is representative of the information that may included in the metadata. It will be appreciated by those skilled in the art that additional representations and organizations of metadata that may be utilized in an embodiment in connection with the techniques herein are possible.

In one embodiment, the metadata may be stored in the relational database in four tables as listed below:

| DB Table Name | Table Name | Contents |
| --- | --- | --- |
| md_table | MetaData-Table | Lists all the tables and their attributes that can be referenced from the object representation or attributed compliance representation. |
| md_column | MetaData-Column | Lists all the database table columns and properties for each of the tables in md_table. The column's properties include type, XML tag information, and possible uses. |
| md_navigation | MetaData-Navigation | Lists all of the relationships or navigations between tables. Navigations often express relationships like "contains" or "is contained in". The navigation information includes the foreign key relationships and other information to join the tables together. |
| md_projection | MetaData-Projection | Each md_table has an associated set of projections given by name, that represent columns to be displayed and a display order. These can be used as a short hand for selecting what columns are to be displayed. |

Additional details regarding the fields for each of the metadata tables will now be described.

The MetaDataTable (MDT) table contains a listing of all the database tables defined for use with the object representation. Each entry or row of data in the MDT represents a logical object type in the object representation. It should be noted that an instance of an object type may be represented in the database using multiple physical database tables that are joined together to make a composite representation of the object. In connection with the objects in the example of FIG. 8, the database may include a database table for each of the object types of "Device" and "AccessList", and "AccessListRule". An entry may be included in the MDT table for each of these object types.

Below is an example of different columns that may be defined for each entry in the MDT.

| Column Name | Type | Description |
| --- | --- | --- |
| Id | Long | A unique identifier for a particular entry in the MDT.. This is a unique identifier used to refer to an entry in this table. |
| TableName | String | The database's name of the table. This entry is used to generate SQL references to the table. The Tablename field is unique with respect to all defined database tables. This may be referred to as a "physical" name for the table. |
| LogicalName | String | The logical name for the table. This name will indicate an object type like "Device" as used within the object representation. The LogicalName insulates the user from the physical name of the database table (or tables) used to instantiate the objects such as in connection with the compliance query and rule information as described herein. The LogicalName field is unique with respect to all database tables and may be referred to as a "logical" name for the database table. This field is used in connection with mapping or converting between the object representation and other representations, such as the database and XML representations, of the configuration information state information. |
| XmlElementName | String | The name for this object type in an XML Schema. If an XML element is found with this name, the attributes and embedded elements will describe an object of this type. This field may be used in connection with mapping between the XML representation and the object representation as described herein. |
| XmlPath | String | The path in an XML schema to this element. This field is used for generation of an XML representation as described herein. This indicates the location of this object in the XML schema hierarchy. |
| IdColumnName | String | The column name of the unique identifier for the table. The column name identifies a database table column containing the index or key used to uniquely identify each row in the database table TableName. |
| isEditable | Boolean | A property indicating whether objects of the specified type can be manually edited by application users. If this property is false, the user should *not* be able to invoke editing screens on such an object. This may be used in connection with a user interface and indicating what can be modified by a user. |
| isPersistable | Boolean | A property indicating whether this Object type is a persistable unit. If true, objects of this type (together with any objects recursively contained in them) may |

| Column Name | Type | Description |
|---|---|---|
| | | be persisted. For example, an "AccessList" is a persistable unit that can be persisted along with any "AccessListRules" it may contain. |
| Join1 . . . Join4 | String | A list of implicit join clauses used to construct the composite Object representation. This field may be used for implicitly JOINing information in multiple database tables to form a composite object representation. The various joins are numbered 1 . . . 4. The information in this field may be used to convert a user specified table alias xxx for a database table (e.g., as included in a compliance query form) to JOIN with one or more other database tables that may be named according to a specified naming convention. For example, the database tables for a table alias of "xxx" may be expanded to refer to the original database table (e.g., xxx_0) as well as other database tables to be JOINed (e.g., named xxx_1, xxx_2, xxx_3, and xxx_4). In one embodiment up to 4 additional tables may be JOINed with an original table as part of processing performed in the SQL query generation. In this way a user can specify a single table alias for the composite object (e.g., actually included in more than one database table), and depending on what column the alias is used with, the appropriate physical database table reference is automatically generated. |
| Order1 . . . Order2 | String | The column name used to order query results if no ordering is explicitly specified in the query. These fields will generate an SQL clause like "ORDER BY order 1 ASC, order2 DESC". This may specify a column name in the object representation or database table column. |
| Order1Ascending . . . Order2Ascending | Boolean | Indicates whether the implicit order by clauses (above) should be generated with ascending (true) or descending (false) order. |

In connection with the above example MDT entries, various fields, such as the TableName, LogicalName, and XMLElementName, may be used in connection with performing the mapping or converting between different representations. Mapping between different representations may be performed, for example, in connection with storing collected configuration state information in the database as illustrated in FIG. 5, and remedial action processing as illustrated, for example, in FIG. 7. One or more fields, such as the isEditable field, may be used in connection with user interface and interaction processing that may be provided in an embodiment.

The MDT may be used in connection with query formation and processing. The MDT may be used, for example, in connection with mapping between the logical and physical (e.g., object and database representations), validation processing (e.g., ensure variables in the compliance query form and rules are defined), and the like. As a further example, the Join1 . . . Join4 field described above may be used to implicitly construct a composite representation of an object which is stored in multiple physical database tables. In other words, in one embodiment, an object in the object representation may be represented in the database representation using multiple database tables. When reference is made to the object, for example, in connection with user input for compliance queries, the user does not need to be burdened with knowledge of the multiple database tables in the database representation. The composite representation of the object in the database representation may be formed implicitly using the information in this field. As such, the user may make reference to the object, for example, in the compliance query form resulting in retrieval of information from multiple database tables. The foregoing may be useful for a variety of reasons such as, for example, insulating user entered compliance query information from changes to the database model.

As an example in one embodiment using the Join1 . . . Join4 field to form a composite object for a device, processing to form the SQL queries for the device may utilize the form "$m.IdColumnName=$n" where m and n in this example each have a value from 0 . . . 4, inclusively, and m>n. In connection with forming a JOIN clause for a first JOINed table (e.g., designated $1) with the original base table (e.g., designated $0), the foregoing expands to "$1.IdColumnName=$0". When constructing the SQL query, each $m and $n is replaced with the table alias of the designated database table. IdColumnName may be a specified field name used in the implicit JOIN clause being constructed. If no field name is specified, the unique identifier field or IdColumnName for the database table is implied. With reference to "$1.IdColumnName=$0" for joining the original base table with a first database table, the IdColumnName of the original database table (e.g. for $0) is implied if no field name is specified. In a fashion similar to the foregoing described with respect to a base table $0 and a first JOINed table $1, implicit JOINs may be constructed for use in a database query for subsequent tables 2-4 that may be utilized by substituting in appropriate table aliases and IdColumnNames if no field names are specified.

The "Order1 . . . Order2" and "Order1Ascending . . . Order2Ascending" fields may be used in connection with forming the result set(s) in a particular order. The Order1 . . . Order2 field causes an additional SQL clause to be included in the generated SQL statements as part of query processing.

The MDT may also include other fields than as described herein. For example, in one embodiment, an additional field may be included in each entry corresponding to a particular object representation type. The additional field may be used in connection with performing specialized or additional processing for this object type when encountered in connection with query generation, remedial action processing, and the like, as described herein. There may be predefined points in connection with processing various objects described herein, such as for query generation, remedial action processing and the like, at which additional processing may be necessary based upon the object type. In one embodiment, a Java class may be specified in the foregoing additional field for an object type. The Java class may be loaded and routines therein invoked when processing the object type. This allows for selectively loading routines for use in connection with processing performed for a particular object type. This class may be used to perform additional processing as may be needed for a particular object such as, for example, consistency checking, extra data validation, and the like.

Additional detail regarding the MetaDataColumn (MDC) table will now be described. Entries in the MDC table correspond to columns in one of the database tables defined in an MDT. For example, with reference to FIG. 10, an entry in the MDC table exists for each column in the database tables of the example 700 of FIG. 10. The column attributes and properties are used for identifying keys, XML elements and attributes, types, and the like, in connection with a variety of processing steps as described herein such as, for example, when executing a query or performing a database update. Each of the columns in the MDC table that may be included in an embodiment are described below.

| Column Name | Type | Description |
| --- | --- | --- |
| Id | Long | A unique identifier for a specific MDC entry. |
| Table Id | Long | A foreign key reference to a MDT table column name (i.e., md_table(Id)) identifying the MDT that contains this column. This may be referred to as the identifier for a particular MDT corresponding to this entry. |
| ColumnName | String | The database's name for this column. This might be referred to as a "physical" name for the column. |
| JoinSelector | Integer | A number that specifies which (if any) of the implicitly joined tables the column is actually physically in. A value of 0 indicates the fundamental table named in MDT.TableName; a vaule of 1-4 identifies the table joined in MDT.Join1 - MDT.Join4 respectively. This value is used to translate user table aliases into a version that specifically represents one of the implicitly joined tables (as described above). This field may be used in connection with implicit construction of a composite object as described elsewhere herein with the "join1 . . . join4" field of the MDT. The Join Selector is an integer identifier in the range 0..4, inclusively, identifying which one of the Joins 0..4 correspond to the database table indicated by the TableName field. |
| LogicalName | String | The logical name for a column. This provides insulation from the names the user provides to the actual DB column names. The LogicalName needs to be unique within the context of a single MDT or Object type. This field indicates the name of the attribute in the object representation. |
| XmlElementName | String | The name for this attribute of the Object in an XML Element (if non null). |
| XmlAttributeName | String | The name for this attribute of the Object in an XML Attribute List (if non null). Typically, only one of XmlElementName or XmlAttributeName is non-null, indicating whether this attribute is expected in an XML Element or an XML Attribute List. |
| Type | String | This field is the Java object type that would be presented to external interfaces such as the UI. Note that this may be different than the database JDBC type, especially if translation tables (defined below) are used. |
| isDisplayable | Boolean | A boolean indicating whether this attribute should be displayed to the user. Fields that should remain hidden from user view should set this attribute to "false". |
| isDisplayedByDefault | Boolean | This field indicates whether the field should be displayed by default. |
| isEditable | Boolean | This field indicates the attribute can be changed by the user (typically in a form that contains all the attributes of a particular object). Fields that are not user changeable should set this attribute to "false." Editors should "grey" such fields on any editor type display. |
| isAbsoluteKey | Boolean | This boolean indicates the column is a key that is unique across *all* entries in the database table, like |

| Column Name | Type | Description |
|---|---|---|
| | | an *old* or *id* field. This field is permissible as the target of a foreign key constraint. |
| isRelativeKey | Boolean | This field indicates whether the column is a key that is unique within the context of a specific object that contains the object specified by this table. For example, within a particular Device, the Name of an AccessList is unique relative to the device and accordingly this field is set to true in this example. |
| isInDeviceXML | Boolean | Indicates whether this attribute is in the Device-Interchange XML schema, and should be captured by the device driver. |
| TranslationTableString | | The name of a database table used for translation of the information of this column to/from a user consumable form. Translation tables are typically used for converting enumerations stored in the database into human readable form. The enumerations may be represented in the database as integer values or as strings consisting of unique class path names, etc. Either an integer or string key may be used to look up the corresponding "Value" of the translation. Reverse translation is also possible by using the Value to lookup the corresponding original Integer or String key. |

The MDC table may be used, for example, in connection with validation processing (e.g., ensure references included in the compliance test are defined) and mapping between various representations. The fields isDisplayable, is DisplayedByDefault, and isEditable may be used in connection with user interface implementation that may be included in an embodiment to indicate what items should be displayed to a user, for example, in connection with menu options. The fields isAbsoluteKey and isRelativeKey are boolean indicators which specify scoping information for the column name described by this entry in the MDC table. These boolean indicators may be used, for example, during processing as described herein when looking up information in the database tables for expression processing, name validation processing, and the like.

The TranslationTable field may be used in connection with converting a database representation to another form for use in connection with a user interface. For example, an enumeration may be defined as 0 . . . 5 as stored in a database table. Each value in the enumeration may correspond to one of 6 types that may be described by a string name. The string name may be presented to the user as part of the user interface rather than the integer value of the enumeration. The translation table indicates which string corresponds to each integer value of the enumeration.

The field isInDeviceXML may be used to indicate that there is an XML element in the XML representation that corresponds to an element of information captured by a device server. This field may be used in connection with mapping between raw collected information and the XML representation. This field may indicate which particular collected data items are included in the XML representation. In one embodiment, a device driver may utilize additional mapping tables to map collected data items to particular XML elements. When performing processing for converting from an XML representation to generate device commands, this field may be set for those items for which commands may be generated. The field indicates whether the additional mapping tables included in the device-interchange XML schema include a corresponding entry for this XML element. As such, this field when set (e.g., =1) may indicate that the device driver collects data corresponding to this element.

As described in connection with the MDT table, each entry in the MDC table may also include an additional field for specialized or additional processing but the level of granularity for the processing is on a per-column basis.

An embodiment utilizing metadata may also include a MetaDataProjection (MDP) table to define predetermined sets of columns retrieved in connection with performing various queries. Each table, as described by the MDT, may have multiple projections. A projection may be defined as a grouping for use in connection with providing a user interface. Each such projection may be defined by a set of MetaDataProjection (MDP) entries. The key used to fetch database elements associated with a particular projection may be represented by a pairing of the MetaDataTable id and the Projection's Name. One entry appears in the MDP for each column to be included in the query. The columns that may be included in an embodiment of the MDP table are described below.

| Column Name | Type | Description |
|---|---|---|
| Id | Long | A unique identifier for a particular entry in the MDP table. Each entry represents one column to be included in the projection. |
| Table_Id | Long | A foreign key reference to the MDT Id field indicating which table to which the projection belongs. |
| Projection-Name | String | The name of the projection. Example names may by "basic" for a basic view, and "detailed" for a detailed view. The set of MDP entries that make up a particular projection may be defined by the pairing of Table_Id and ProjectionName. |
| Column-Name | String | The column to be included in the projection. It can be named logically or physically. |
| Display-Order | String | The order in which this column should be displayed relative to other columns. Lower numbers represent a higher priority, and should be placed further left in a tabular display than higher numbered columns. |

As an example, a basic projection may be defined for a device. A device may actually have 100 defined attributes or pieces of information. In connection with a user interface, it may be desirable to display different groupings of these attributes with each defined grouping expressed as a projection. A user may want to view the information about a device which is characterized as basic, rather than a detailed view of all 100 items. As such, an embodiment may define a basic projection and a detailed projection. The basic projection may include 15 of the 100 items. The detailed projection may include 100 items. In connection with defining the basic projection, the MDP table includes 15 entries for each of the 15 items included in the basic projection. The MDP table also includes 100 entries for each of the 100 items included in the detailed projection. When presenting information to a user for a basic display, the MDP table may be utilized to determine the particular columns to be retrieved from the database. The MDP table may also indicate the ordering in which the retrieved data should be presented to a user, such as using the DisplayOrder field described above.

An embodiment may also include a MetaDataNavigation (MDN) table to represent the possible navigations or relationships from one table to one or more other associated tables. The MDN may be used to represent "Contained In" relationships (e.g., AccessList contained in Device), or "Contains" relationships (e.g., Network contains Devices), or arbitrary relationships (Device to Sites). The relationships can be one-to-many, many-to-one, many-to-many, or revisioned. The contained-in and contains relationships may be characterized as hierarchical relationships. The arbitrary relationship may be characterized as non-hierarchical. Both hierarchical and non-hierarchical relationships can be one-to-many, many-to-one or many-to-many. Additionally, an embodiment may also include revisions in which multiple versions or sets of configuration information may be stored for a same device. Multiple revisions may exist, for example, if multiple sets of gathered configuration state information are maintained over time for a device. An embodiment may also use the MDN tables to describe how revisions are represented in the database.

In one embodiment, an entry may be included in the MDN table for each relationship or navigation. Each entry in an embodiment may include the following described below.

| Column Name | Type | Description |
| --- | --- | --- |
| Id | Long | A unique identifier that selects a single MDN within the table. |
| Table Id | Long | A foreign key reference to the MetaDataTable containing this Navigation. The Navigation describes an operation that can be done given an object described by the associated MDT. The MDT entry represents the table that "owns" the Navigation. |
| NavigationName | String | A name for this navigation, such as AccessList, that uniquely identifies the navigation in the context MDT for which this navigation is a part. |
| DisplayText | String | A string describing the Navigation, such as "AccessList in Device", that can be displayed by a user interface |
| NavigationTable | String | The foreign table that can be referred to by the "owning" table. This may be expressed as a logical name (e.g. on object representation) or physical table name (e.g., in database representation). |
| NavigationLocalTableKey | String | The column in the table that owns this navigation that refers to the foreign key of the local table. |
| NavigationForeignTableKey | String | The column in the foreign table that represents the foreign key being referenced by the owning table. |
| LinkTable | String | The (physical) name of a link table that allows many-to-many or many-to-many revisioned relationships. |
| LinkLocalTableKey | String | The column in the link table that is joined with the column in the local table specified by NavigationLocalTableKey. |
| LinkForeignTableKey | String | The column in the link table that is joined with the column in the foreign table specified by NavigationForeignTableKey. |
| isNavigable | Boolean | IsNavigable indicates whether the navigation is to be used as a means of table traversal by users. This boolean may be used in connection with a user interface indicating whether information about this navigation should be made available to an interactive user. |
| isContains | Boolean | The Navigation represents the "Contains" relationship; where an object in the owning table contains object(s) in the foreign table. |
| IsContainedIn | Boolean | The Navigation represents the "Is Contained In" relationship; where an object in the owning table is contained in an object in the foreign table. |
| IsRevisioned | Boolean | This boolean indicates the link table contains a revision_number field, which can be interpreted as follows where there is a Contains or IsContainedIn relationship. The table (whether local or foreign) table that Contains the other *must* have a revision number field. The RevisionNumber represents the current revision number of an object in that table. The containing object contains objects represented by the other side of the relationship. It may contain multiple copies of the same object of different revision_numbers. As an example, a device contains a revision_number, which is the current revision_number. If AccessLists |

-continued

| Column Name | Type | Description |
|---|---|---|
| | | are added using a revisioned link table to the object, their links have the Device's current revision_number when created. Using the revision number of the Device, all the objects persisted at that revision_number, or any earlier revision_number, may be retrieved by specifying an appropriate selection criteria in the query that includes a join using the revisioned link table. |
| NavigationLocalRevision | String | The column in the local table that contains the revision number for revisioned links. If it is desired to retrieve the current revision information, an SQL WHERE clause will be used to match this field against the field specified in the link table column identified by LinkRevision. |
| LinkRevision | String | The column in the link table that contains the revision number for revisioned links. |

In connection with the MDN table, a "local table" or owning table may be referred to as the table that owns the relationship. In other words, the entry and relationship described is made with reference to a first table called the local or owning table. The local table may be related to another foreign table. For example, a contained in relationship may be defined with respect to a device so that access list is contained within device. The database may include a device table and an access list table. The device table may be the local or owning table and the access list table may be referred to as the foreign table. If only one access list can be contained within any single device instance, then the relationship is a one to one relationship. If multiple access lists can be included in a single device instance, then the relationship is a one to many relationship.

In connection with the MDN table fields described above, a link table may be used to represent many to many relationships. The link table may also be used in connection with an embodiment supporting revisioning or storing multiple copies of configuration state information. In one embodiment, the link table includes pairs of foreign keys used to relate entries of the local and foreign database tables. Foreign keys may be characterized as pointers or links to database table entries. A foreign key of a database table is used to identify a unique entry in the database table. Foreign keys are defined with respect to each database table to access entries therein. The foreign keys may be used to link an entry of one table to another related entry of another table. One use of foreign keys is described elsewhere herein in connection with JOIN clauses. Foreign keys may also be used in connection with the MDN tables to represent the relationships between entries of various database tables. Examples further illustrating some uses of the MDN table and link table in connection with relationships, revisioning and remedial action generation are described in more detail in following paragraphs.

Figure 18:
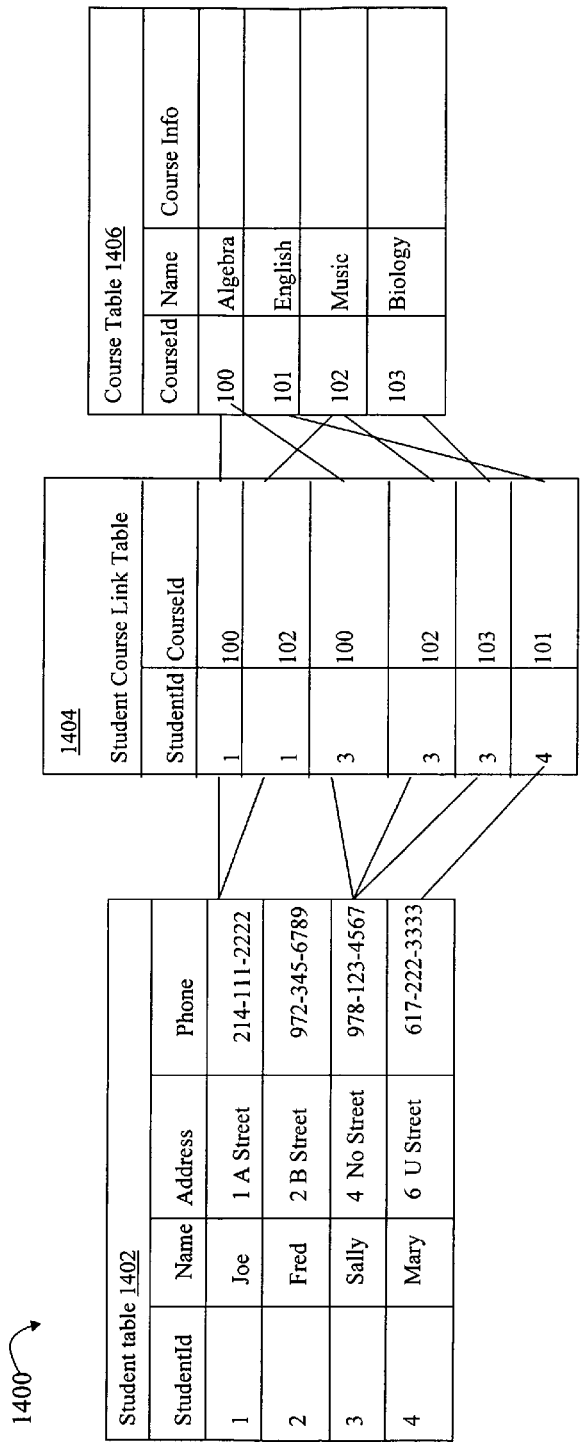
FIG. 18 is an example illustrating representation of a many to many relationship using the techniques herein.

Referring now to FIG. 18, shown is an example illustrating the use of the techniques herein in connection with describing a many to many relationship. The example 1400 includes a student table 1402, a link table 1404 and a course table 1406. The link table 1404 may be used in connection with representing a many to many relationship between students included in the student table 1402 and courses included in the course table 1406. Each of the tables 1402, 1404 and 1406 may be database tables. A student may be in more than one course and each course may include multiple students. The example 1400 may be used in representing the foregoing many to many relationship between students and courses. The MDN table may include an entry expressing the relationship or navigation from student table to course table and a second entry expressing the relationship or navigation from course table to student table. In the example 1400, student id=1 (e.g., Joe) is in two courses and student id=3 (e.g., Sally) is in 3 courses and student id=4 (e.g., Mary) is in 1 course. The link table 1404 is used to link each entry in table 1402 to one or more entries in table 1406. The link table 1404 is also used to link each entry in table 1406 to one or more entries in 1402. The many to many relationship may be expressed using two MDN entries including the following:

ENTRY 1
Navigation from Student Table to CourseTable:
   NavigationTable: CourseTable
   NavigationLocalTableKey: StudentId
   NavigationForeignTableKey: CourseId
   LinkTable: StudentCourseLinkTable
   LinkLocalTableKey: StudentId
   LinkForeignTableKey: CourseId
   isRevisioned: false
ENTRY 2
Navigation from CourseTable to StudentTable:
   NavigationTable: StudentTable
   NavigationLocalTableKey: CourseId
   NavigationForeignTableKey: StudentId
   LinkTable: StudentCourseLinkTable
   LinkLocalTableKey: CourseId
   LinkForeignTableKey: StudentId
   isRevisioned: false It should be noted that the above example MDN entries may include other fields in each entry. The above ENTRY 1 describes the relationship from student table to course table and ENTRY 2 describes the relationship from course table to student table. In each entry, the originating database table that owns the navigation entry is referenced as the local table and the other table is the foreign table. The foreign keys in each of the tables used to relate or link two associated entries are denoted by the two fields NavigationLocalTableKey and NavigationForeignTableKey. The corresponding columns in the link table that hold the keys for the local and foreign table are found in the MDN LinkLocalTableKey and LinkForeignTableKey columns.

Figure 19:
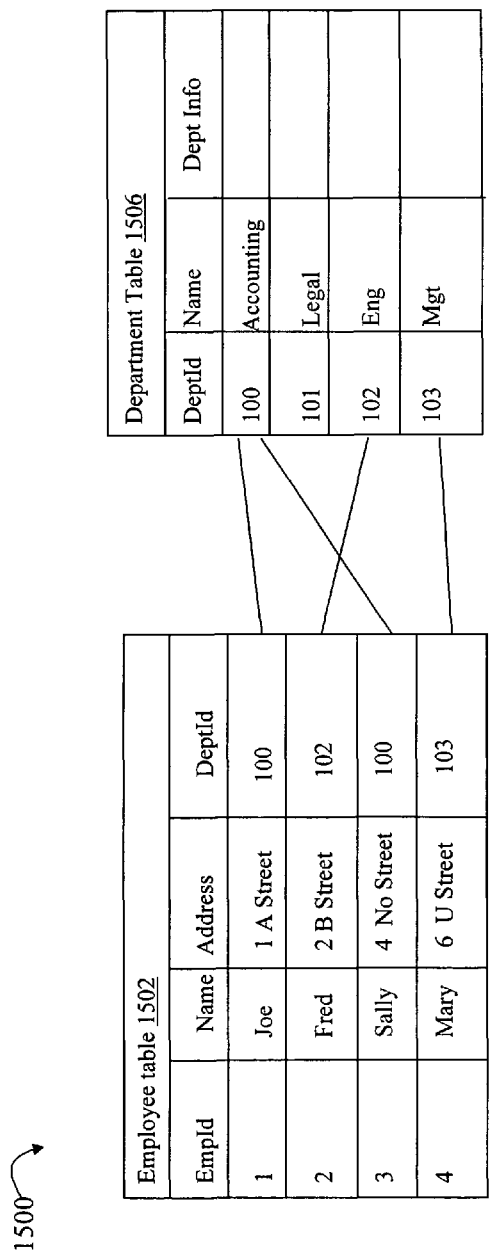
FIG. 19 is an example illustrating representation of a one to many relationship using the techniques herein.
Figure 20:
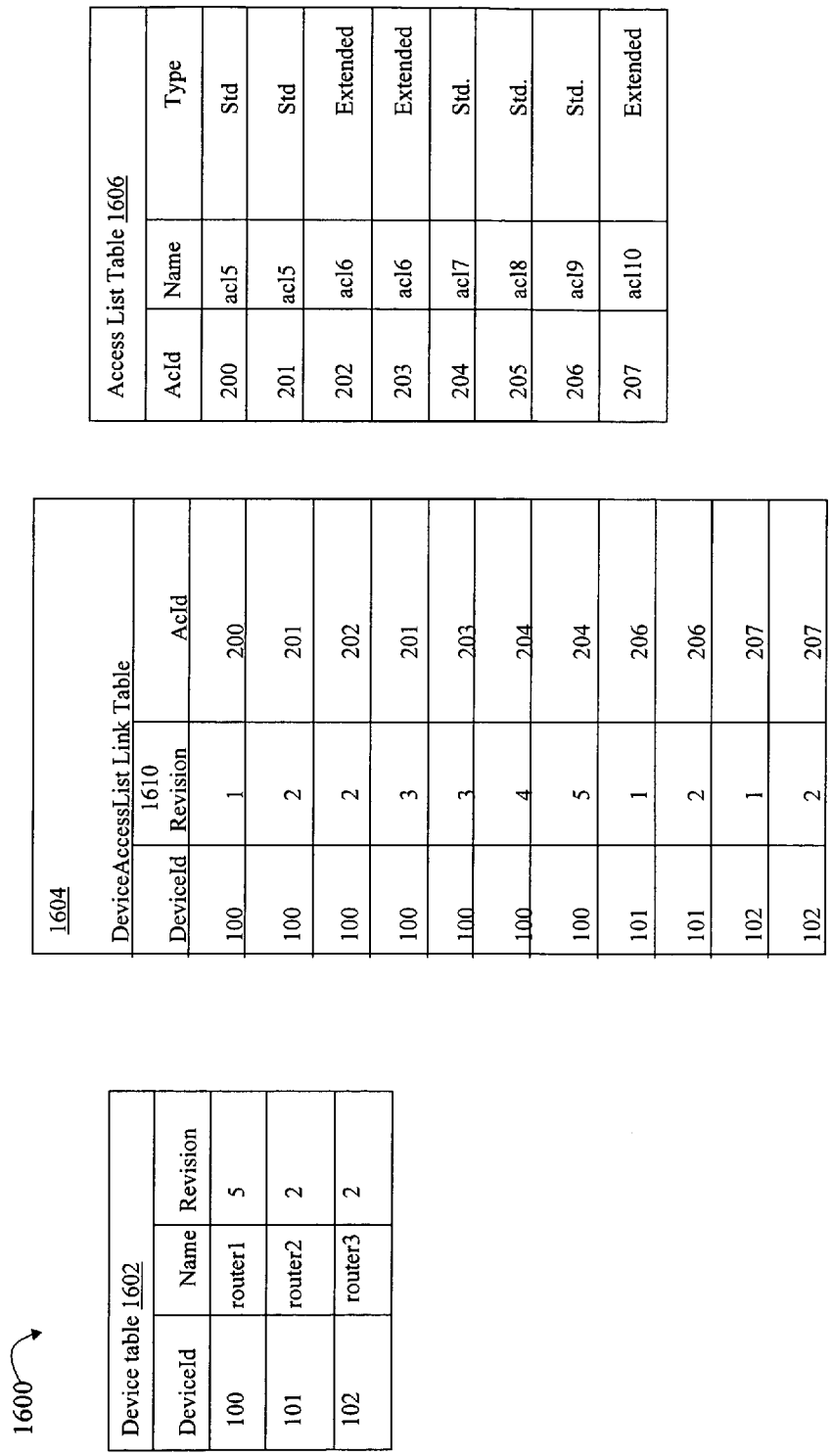
FIG. 20 is an example illustrating use of revisioning in connection with the techniques herein.

Referring now to FIG. 19, shown is an example illustrating use of the techniques herein to represent a many to one relationship. The example 1500 illustrates the relationship where there may be one or more employees in each department but each employee may only be in a single department. The example 1500 includes an employee table 1500 and a department table 1506. The table 1502 includes an entry for each employee and the table 1506 includes an entry for each department. In this example, no link table is needed to represent the relationships between the tables. Rather, an entry from table 1502 which is associated with an entry of table 1506 has the same DeptId (department identifier). The relationships between the tables may be representing using two exemplary MDN entries as illustrated below:
Navigation from EmployeeTable to DepartmentTable:
NavigationTable: DepartmentTable
NavigationLocalTableKey: DeptId
NavigationForeignTableKey: DeptId
LinkTable: null
isRevisioned: false
Navigation from DepartmentTable to EmployeeTable:
    NavigationTable: EmployeeTable
    NavigationLocalTableKey: DeptId
    NavigationForeignTableKey: DeptId
    LinkTable: null
    isRevisioned: false Referring now to FIG. 20, shown is an example illustrating use of the link table in connection with revisioning or an embodiment allowing multiple versions of a configuration information. In the example 1600, included are a device table 1602, a link table 1604 and an access list 1606. Table 1602, 1604 and 1606 are database tables. Table 1602 includes an entry for each device in a network for which configuration state information may be collected. The table 1604 may be referred to as a revisioned link table used to maintain multiple copies of the same access list for different revisions of a device's configuration state information. In the example 1600, the device router1 has 5 configurations:
    Router1 revision 1:
    Ac15 (AcId 200)new in this revision
    Router1 revision 2:
    Ac15 (AcId 201) revised from the previous Ac15
    Ac16 (AcId 202) new in this revision
    Router1 revision 3:
    Ac15 (AcId 201) same as revision 2
    Ac16 (AcId 203) revised from the previous Ac16
    Router1 revision 4:
    Ac17 (AcId 204) new this revision
    (previous Ac15 no longer present)
    (previous Ac16 no longer present)
    Router1 revision 5:
    Ac17 (AcId 204) same as in revision 4

Device Router 2 and Device Router 3 each have two configurations for two revisions. An example of an MDN table entry describing the relationship or navigation from Device to AccessList may be:
    NavigationTable: AccessList
    NavigationLocalTableKey: DeviceId
    NavigationForeignTableKey: AcId
    LinkTable: DeviceAccessListLinkTable
    LinkLocalTableKey: DeviceId
    LinkForeignTableKey: AcId
    NavigationLocalRevision: Revision
    LinkRevision: Revision
    isRevisioned: true In an embodiment including revisioning, an object may include a revision number field as indicated in table 1602, $3^{rd}$ column, to indicate the current revision number represented by a table entry or instance in the database. The revision number as indicated in the revision field of 1602 may be used to find and retrieve configuration state information such as configuration state information of the current revision. When retrieving information related to a particular revision number, all entries in link table 1604 having a revision number matching a desired revision are retrieved. For example, if the current revision as indicated is revision=5 in the device table, matching entries in the link table also having a revision=5 are determined.

In the example 1600, AcId refers to the Access List identifier. The link table 1604 includes in each entry three fields—the pair of related foreign keys as described in connection with other examples herein and an additional revision field 1610. The revision field 1610 may be used to indicate the revision number of the configuration state information. The MDN entry above indicates that the key DeviceId is used to relate an entry of 1602 to an associated entry in table 1604. The entry in table 1604 is then associated with an entry in 1606 using the AcId key for each entry of 1606. The isRevisioned field=true indicating that this entry uses a link table to provide revisioning. As an example, it is possible to select only the latest revision data by adding an SQL "where" clause of the form:

"WHERE DeviceTable.Revision=DeviceAccessListLinkTable.Revision".
In an embodiment, table aliases may be used in lieu of the Object types in connection with the WHERE clause. The column name of the link table containing the revision number is specified by the MDN LinkRevision column.

As another example, an entry in the MDN table may be used to represent an arbitrary or non-hierarchical relationship.

Figure 21:
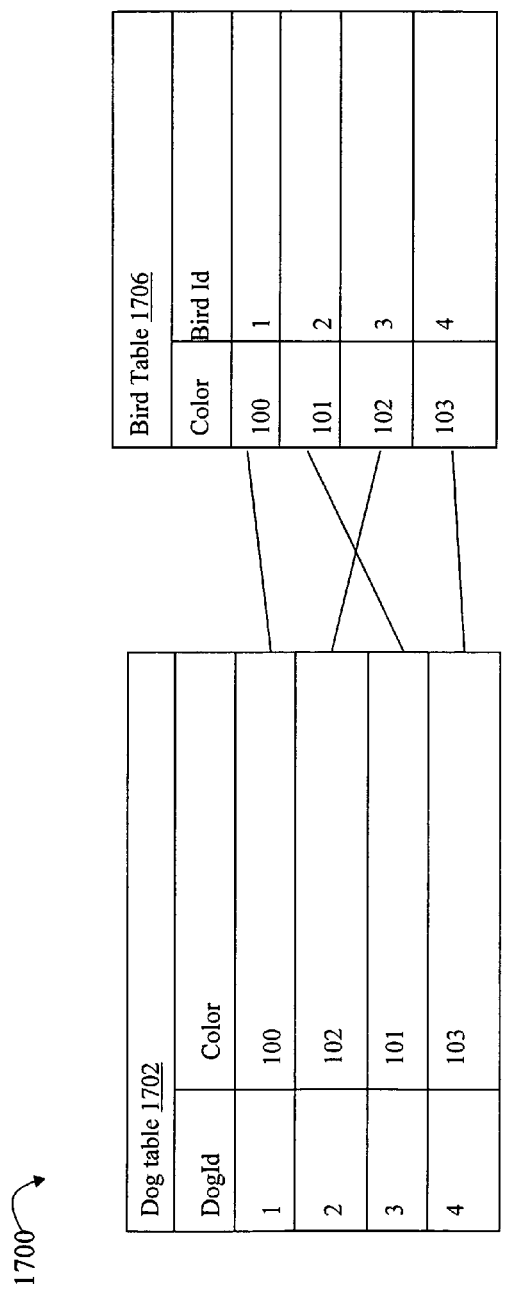
FIG. 21 is an example illustrating a non-hierarchical one to one relationship using the techniques herein.

Referring now to FIG. 21, shown is an example illustrating a representation of a one to one non hierarchical relationship in connection with the techniques herein. The example 1700 includes a first database table 1702 with information regarding dogs and a second table 1706 with information regarding birds. An entry is included in the first table for each dog and similarly an entry is included in the second table for each bird. A bird and dog may be related to one another based on some relationship referred to as arbitrary such as, for example, color. An example MDN table entry for the illustration 1700 may include the following information:
    NavigationLocalTableKey: Color
    NavigationForeignTableKey: Color
    LinkTable: Null
    IsContainedIn: False
    IsContains: False The MDN tables may be used to create a database JOIN using the foreign keys indicated by the NavigationLocalTableKey and NavigationForeignKey fields. As described elsewhere herein, the foreign keys may be used in connection with joining multiple database tables together in connection with processing a compliance query to construct an SQL query, for example, in connection with FIGS. 10 and 11. The foreign keys of the MDN table may also be used in connection with a database JOIN for composite objects as well where an object may be represented using multiple database tables in an embodiment. As an example using the MDN tables in connection with generating the SQL query as described herein, the MDN tables can be used so that the user, when specifying a query such as using the form of FIG. 11, does not need to know the foreign keys of the database table used in connection with JOINS for the query construction. With reference to FIG. 11, column 814 may be specified in a different form than as indicated. What will now be described is an alternative form for column 814 data in which the MDN tables may be used so that the user does not have to have knowledge about what foreign keys are actually used to form the JOIN/link the database tables.

Following is another example representation of the join section that may be included in an embodiment of the query form previously described in FIG. 11. The following includes an additional column 815 as follows:

| Tables (810) | Table Alias (812) | Join On (814) | Join Navigation (815) | Include Null 816 |
|---|---|---|---|---|
| Device | d1 | | | |
| AccessList | a1 | d1 | "Access Lists in Device" | |
| AccessListRule | r1 | a1 | "Rules in Access List" | |

Column 814 may be used as described elsewhere herein in connection with FIG. 11 to specify explicit join equations of the form: alias1.column1=alias2.column2. In this instance, column 815 is not used and is therefore null. However, as an alternative to the foregoing, information in columns 814 and 815 may be used. In connection with this latter technique, an interactive menu display and selection may be used to specify the navigation to use in connection with the JOINs rather than have a user specify the foreign keys in 814 as illustrated in FIG. 11. As will be described in more detail in following text, a menu may be displayed which includes a list of possible navigations from which a user may make an interactive selection. In connection with forming the first JOIN clause joining Device and AccessList, a first list of one or more navigations from Device to AccessList may be displayed and the user may make a selection. In connection with forming the second clause joining AccessList and AccessListRule, a second list of navigations from AccessList to AccessListRule may be displaued and the user may make a selection.

With reference to the foregoing alternative form set forth above, the user specifies the table to be joined against in column 814 by supplying the table alias without the other field names as illustrated in FIG. 11. For example, when referring to the AccessList entry in 800, "d1" may be specified in column 814 in the row for AccessList. In response, a user interface may implement a pull-down menu. Column 815 may identify the DisplayText column in the MDN table navigation in the MDN table. The MDN "DisplayText" field is what may be displayed as part of the pull-down menu on the screen showing the textual descriptions of all navigations from Device that navigate to an Access List. One or more entries of the MDN table may be identified to form the list of displayed navigations included in the menu. The navigations for the menu in this example may be determined by identifying entries in the MDN table having the Device database table as the owning or local table of a navigation which navigates to a foreign database table for AccessList. The information, including the DisplayText field and the possible navigations from which a user may select, may be included in the displayed menu.

The MDN table may also be used in connection with other user interface operations. For example, a user may be viewing entries in a device database table and may wish to view navigations for a selected device instance. In response to selecting a row for a device in the device database table, the various navigations or relationships for that device may be displayed as represented using the MDN table. The list of device navigations may include an item for "Access Lists in Device". Selection of the foregoing item may result in displaying the access list(s) for the selected device instance. Such information may be utilized, for example, by a user to interactively obtain information for formulating a compliance query.

The MDN tables may be used in verification or validation processing to ensure that a user has specified a valid hierarchical structure or relationship in connection with the compliance query.

The MDN tables may be used in connection with remedial action generation, for example, creating an object using the contained in and contains relationship information. The object may also include all the objects contained within the object as indicated by the MDN tables.

Figure 22:
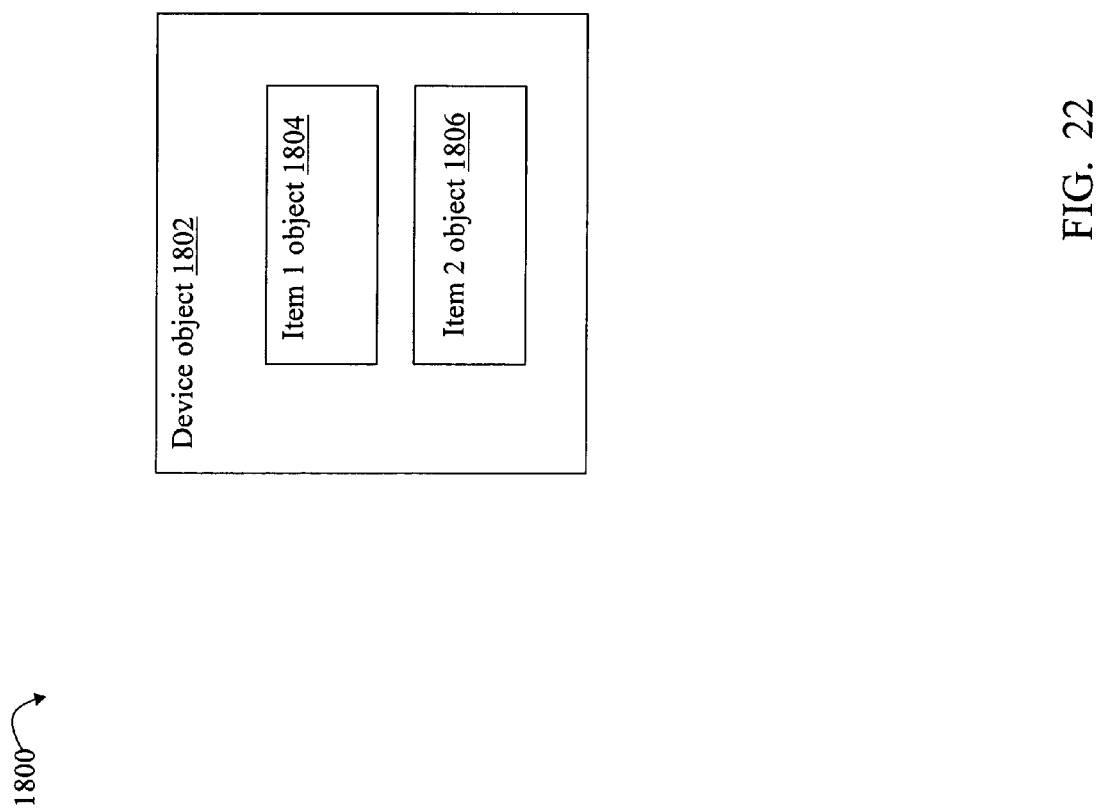
FIG. 22 is an example illustrating use of an object formed as part of remedial action processing using the techniques herein.

Referring now to FIG. 22, shown is an example representation of a device object 1802. Object 1802 may be generated as a result of remedial action processing. In one embodiment, a complete device object 1802 may be generated as part of remedial action processing. It may be that only a portion of the existing configuration state information for the device is actually non-compliant and the remaining portions are compliant. In connection with forming the new object 1802, processing is performed to obtain existing configuration information from database tables regarding those portions of the object which are already correct. Additionally, those portions of the object which include non-compliant data are determined and updated with the correct compliant configuration information. In connection with the foregoing, the MDN tables may be used to retrieve the existing database information in forming the object as well as determine what portions of the object are updated with the corrected configuration state information. With reference to the example 1800, a complete device object 1802 may be generated. Item 1 1804 may be the only nested object of the device which needs to have its information corrected. The MDN tables may be used to retrieve existing configuration data information for all other portions of 1802 except for element 1404. The MDN tables may then be used to determine where Item1 1804 is structurally located within the device object 1802. The corrected configuration state information, as may be determined from the compliance testing rules, may then be stored in 1804.

In another embodiment, a smaller atomicity level may be selected in connection with generating the object for the remedial action. For example, rather than generate a complete device object as above, an embodiment may generate an object at a lower atomicity level in the hierarchical structure of the device object in which the generated object includes the corrected configuration state information. However, the generated object may have a level determined to be as the minimal level containing all the corrected configuration state information. For example, with reference to 1800, an embodiment may generate a remedial action object only for Item 1 1804.

The remedial action atomicity level may indicate what objects and sub-objects are to be generated as a single unit. In other words, the atomicity level indicates what objects need to be updated as a group if any single element in that group is updated as part of a remedial action. Either all elements in the indicated group are updated, or none. For example, an access list may include one or more access rules. The remedial action atomicity level may indicate that if a single rule in an access list is updated, the entire access list needs to be included in the object generated as part of remedial action processing. An embodiment may indicate the foregoing atomicity level using an indicator, for example, in each entry of the MDT table corresponding to an object in the object model. The indicator may be a boolean indicating whether an object at this level may be generated as a single unit. If not, then remedial action generation may examine the indicator for the object at the next highest hierarchical level and generate the smallest possible object containing or including the non-compliant configuration information. In connection with the MDT table described herein, another boolean indicator may be used to indicate the remedial action atomicity level as described above.

In one embodiment in connection with processing to convert from the relational database representation to the object representation, an object tree is generated for a starting object. The object tree may be generated using the MDN table to determine what objects are contained in the starting object at a first level. Processing may be performed to fully expand on each object hierarchically contained within the starting object at the first level. The foregoing may be performed in a recursive fashion to determine all objects contained within the starting object at each of one or more nesting levels. For each object contained within the starting object, the MDC table may then be used to determine the object attributes and retrieve corresponding information from the relational database. The MDC and MDT tables may be used to perform any mapping from the relational database names to corresponding names in the object representation. The object representation expressed as the foregoing object tree may then be converted to an XML representation using the XML element names and/or XML path names as included in the MDT and MDC tables described herein. It should be noted that foregoing processing in generating the object tree may be performed in a depth-first or breadth-first fashion in an embodiment utilizing the techniques herein. Processing to convert an object representation in the form of an object tree to a database representation may be performed using the MDT and MDC tables to determine database tables, entries and columns for corresponding elements in the object representation.

The metadata may be used in connection with many different processing operations in an embodiment, for example, on the client, application servers and/or device servers. Following are some example uses of the metadata. Some of those listed below are described elsewhere herein.

1. The list of object types, as included in the object representation and described in the MDT table, can be used to implement a list of object types that are used in filling out the Query Form. The list may be displayed to the user in connection with a user interface, such as with a menu display of available object types.

2. The list of attributes of a particular object type are specified in the MDC table (e.g., the LogicalName field). This information may be used to validate (or allow selection of) the attributes of an object in the compliance rules and compliance query specification.

3. The list of LogicalNames and corresponding ColumnNames in the MDC table may be used to interpret user-entered names in the column names and translate them into database physical column names. This provides a level of indirection allowing the database physical schema to be changed without impacting the compliance test.

4. The MDC table and MDT table entries may include one or more fields to perform special or additional processing. For example, the MDC entries may specify a TranslationTable for use in connection with user interface processing. As described herein, the table entries may also include a Java class specifying a class which is selectively loaded when processing a particular type of data. It should be noted that Java is only one programming language described herein for purposes of illustration and should not be construed as a limitation. It will be appreciated by those skilled in the art that other programming languages may also be used.

5. The MDN table may be used to determine what types of Object(s) an Object contains or is contained in. This allows hierarchical representations of object trees to be constructed. The MDN table may be used in connection with interpreting the XML received from the device drivers or in exporting an XML information representation.

6. The isRevisioned boolean in the MDN table indicates to the revision processing as described herein using other information also included in the MDN table.

7. The MDN table data may be used to implement a pull down menu in the query from expressing how a new table can be joined to an existing table already included in the form. For example if a device is already listed, and a user wants to add an attribute list to the form, the MDN table may be used to determine that devices can contain an attribute list and to determine the appropriate table names and keys with which to construct the JOIN.

8. The XmlElement fields in the MDT and MDC tables and the XmlAttribute field in the MDC table may be used with a SAX (serial access parser API for XML) parser to convert an XML message from the device server into an object representation of the managed device's attributes. The foregoing may be used as part of the processing performed to save the configuration state information collected from the devices in the relational database. Additionally, the XmlElement and XmlAttribute fields may be used to convert the relational database representation or an object representation and generate a corresponding XML representation.

9. Various portions of the metadata may be used in connection with the compliance testing as described herein. For example, database table and database column names (e.g, as included respectively in the MDT and MDC tables) are used to validate the entries in the query form and to translate logical object and attribute names of the object representation to physical database table and database column names. The column type information (e.g., as indicated in the Type field of the MDC table) may be used to specify typed comparisons between data in the results set and the compliance rules, e.g. should comparisons be String comparisons or Integer comparisons.

In connection with the techniques herein, the compliance tests may be written in a manner which does not depend on the syntax of a particular managed device's command language. The compliance tests composed using the techniques herein are therefore independent of device particulars, such as a device family or manufacturer. The compliance tests do not have to be applied to a single device or type of device. The techniques herein may be used to write compliance tests against any arbitrary collection of devices such as, for example, a portion of devices within a network, site, or other entity that includes one or more devices. A single compliance test may be written, for example, for use with a combination of different devices of varying types, manufacturers, and the like. For example, it is possible to check the consistency of the configuration of two different devices by different manufacturers within a network using the techniques herein. The techniques herein may be performed in accordance with a standard or other specification of one or more requirements or expected conditions with which devices are expected to implement.

As described herein, an embodiment may generate automatic remedy operations for many types of failures without specifying the remedial actions explicitly in the compliance test. Additionally, the remedy operations are specified in a way that is independent of any device command language. The remedial action processing described herein may be used to generate a corrective object which is independent of device particulars, such as device family or manufacturer. The object including the correct compliant information may then be translated into one or more different sets of device-specific commands. The commands may be used to perform corrective actions to appropriately configure the non-compliant device. Subsequently after execution of the foregoing device commands, additional configuration state information may be collected from the device. The additional configuration state information may be used to determine if the previously non-compliant device is now compliant after being reconfigured or reset in accordance with the commands associated with the remedial action processing.

As described herein as part of remedial action processing, the object model representation may be converted to an XML representation which may then be converted into one or more device-specific commands by a device driver. Additionally, configuration state information collected by the device drivers may be converted by a device driver to an XML representation which is then converted to an object representation as part of the processing in connection with storing configuration state information in a data container. Using programming languages and regular expressions, device drivers may map and appropriately group collected data into a corresponding XML representation. The XML representation may also correspond to an object model. This object model may be defined in the meta data as described herein. In other words, the device driver may group one or more collected data items together in accordance with an object model having an XML representation. The grouping of particular XML elements is in accordance with the object model. The frequency at which data is collected from the devices and converted to XML may be in accordance with an application server policy or device manager preferences. Configuration state information may be operated on, such as in connection with sending information to/from the device driver, in units based on the atomicity of the modeled elements. Device drivers may utilize mapping tables of vendor specific device attributes to map vendor-specific elements to corresponding elements in the XML and other representations. Device drivers may also utilize mapping tables of vendor specific values which are mapped to a normalized values of acceptable ranges for a modeled element. Relationships and declarative statements can be used in programming languages to group modeled elements together into a device configuration state for the modeled element and any child element(s). Relationships and normalized models for the elements as utilized by the device driver may be verified against the model described by the meta data. In other words, a device driver may perform processing to ensure that its mapping tables are in accordance with the information as may be expressed using the metadata as described herein.

What will now be described is how an embodiment may perform the conversion from the XML to object representation in connection with the techniques herein. As described herein, the XML to object conversion may be part of the processing performed in connection with storing collected configuration state information in the data container, such as the relational database representation. The XML to object conversion is described and illustrated, for example, by block 310 of FIG. 5. As inputs, the processing for block 310 may utilize an XML representation of configuration state information for device and the metadata as described herein. As will be described in more detail below, a SAX (Simple API for XML) parser may be utilized in an embodiment although an embodiment may utilize other tools and parsing and recognition techniques. As known in the art, the SAX parser is implemented as an event-driven model in which the programmer provides callback methods or handlers which are invoked by the parser as part of its traversal of the XML document. Processing steps that may be performed in connection with converting the XML to an object representation for device configuration state information are described below.

1. Using a SAX parser, SAX handlers are defined. The handlers are invoked for each XML element defined by the schema. A first handler may be invoked at the start of each XML element and a second handler may be invoked at the close of each XML element is recognized. Additionally, handlers may be invoked as each XML attribute defined by the XML schema is recognized in connection with parsing of the XML input.

2. A root object reference is initialized as null. The root object reference or pointer identifies the root object of an object tree that is constructed as the XML is parsed. Each node in the object tree contains a reference to its parent object, and a collection of references to its child objects. Each object also contains a list of attributes represented as attribute-name attribute-value pairs.

3. A current object reference or pointer is initialized that points to a current object being processed in the object tree.

4. Parsing using the SAX parser is initiated and the XML input stream is processed.

5. For each new XML element encountered, look for a matching MDT entry using the MDT XmlElement field. If a matching entry is found, the XML element is represented as an object in the tree.
   a. If there is no existing root node for the object tree, set the root and current object reference to a newly generated object of the type specified by the MDT entry. The names for the object and its associated attributes may be determined by utilizing the MDT.
   b. Otherwise, if there is an existing root node for the object tree, processing may be performed to determine where a new object for the XML element currently being processed should be placed (e.g., at what hierarchical level and on what path in the object tree). This may be performed using the MDN table as described herein. It is determined if the new XML element should be represented in the object tree as a child to the current object. This foregoing determination may be made by consulting the MDN table looking for a "contains" relationship from the current object to objects of the type corresponding to the new XML element. If so, generate a new object in the tree which is a child of the current object, and set the current reference to the new object.
   c. If the MDT corresponding to the new XML element is marked "isPersistable", mark the object as persistable, which indicates this object, and all the objects it contains (recursively), are to be persisted as a logically complete unit.

6. If an XML element does not match an MDT entry, it may match an MDC for the current object (in the XmlElement field), which indicates the XML element is an attribute of the current object. If the XML element matches an MDC entry for the current object, generate an attribute for the current object from the XML element's data. The logical name as represented in the object representation and corresponding database names, as well as the type of each attribute, and whether the attribute is a key, can be determined from the MDC information.

7. As XML attributes are recognized, add each XML attribute to the current object if they are identified in the MDC XmlAttribute entry for the current object. The logical and physical names, as well as the type of each attribute, and whether the attribute is a key, can be determined from the MDC information.

8. When the parser leaves or completes an XML element as may be represented using a closing XML marker corresponding to the current object, the current reference is set to the parent of the current object.

The foregoing may be performed as the XML representation is processed. As an output, of the foregoing processing, a hierarchical tree of objects and associated attributes may be produced. The foregoing object tree may be stored in the database or other data container. In other words, processing may be performed as illustrated in block 318 of FIG. 5, to persist the object representation in the data container, such as the relational database described elsewhere herein. As part of 318 processing, the object tree may be traversed in a breadth first fashion to process objects therein. In one embodiment, a boolean indicator (e.g., the IsPersistable) may be used to indicate those objects which are persisted to the data container. For each object to be stored in the database, the database table and associated column names in which the object data is stored are determined using the metadata information. (e.g., the MDT, MDC, and/or MDN tables). One or more database commands may be formed in connection with storing the configuration state information in the database. In one embodiment as described herein using SQL, a determination is made as to whether the object is already in the database. If so, it is removed using a series of SQL "DELETE" statements (e.g., one for each object the persistable object (recursively) contained, and one for the persistable object itself). To save the new instance of the object in the database, an SQL "INSERT INTO" statement may be constructed for the persistable object and each of the objects recursively contained therein.

As described herein, the conversion from an object representation to an XML representation may be performed as part of remedial action processing. In connection with remedial action processing, when non-compliant configuration state information is identified, the database tables corresponding to the non-compliant portions of data are determined using the query result set and the MDT (e.g., by knowing the columns that are associated with the non-compliant data). If all the non-compliant objects are "atomic", meaning they can be sent as an atomic unit without other objects containing the non-compliant object, then the corresponding XML representation for the non-compliant object is determined and may be sent as a single unit to the device driver. Otherwise, for each non-compliant object that may be characterized as not atomic, or not able to be sent as a single unit, a search of the object tree is performed of the ancestors of the non-compliant object. A recursive search is performed going up one level at a time in the object tree representation toward the root to a containing object until a containing object which is atomic is located. The foregoing represents the smallest atomic unit for which a remedial action may be generated. Once the level of atomicity is determined, a corresponding object having the associated level of atomicity may be generated. The content of the corresponding object which contains the non-compliant data is accordingly updated as indicated by the query rules of the failing compliance test. Remaining portions of the object generated in connection with remedial action include compliant data as may be obtained using existing data in the database. XML corresponding to the remedial action object may be generated and sent to the device driver as a single unit. The commands corresponding to the XML may then be sent to the device.

What will now be described are processing steps that may be performed in an embodiment in connection with converting an object representation to an XML representation such as in connection with remedial action processing. The inputs are a tree of one or more objects corresponding to the remedial action object, and the metadata as described above.

1. Initialize a root and current reference to the head node in the object tree.

2. Recursively visit each node in the tree, using a depth first search, setting the current reference to the node that is currently being visited.

3. For each visited node, determine the XML path that should be used for the object. If the current object has a parent node, determine if the current object is a direct descendent of the parent, using the XmlPath field of the MDT entry for the current object, and comparing that with the XmlPath field of the parent object. Generate any intermediate XmlElements as may be indicated by the differences between the current node's MDC XmlPath entry and the parent's Xml path. An XML element for the current node is then generated using the XmlElement name specified in the MDT entry.

4. For each attribute contained in a new element that was generated in the previous step, determine if the attribute is to be included as an attribute (e.g., indicated by XmlAttribute in the corresponding MDC field) or a sub-element (e.g., indicated by XmlElement in the corresponding MDC field). Generate an XML attribute or XML element as may be appropriate the the object's attributes.

5. After all the attributes of an object have been output as Xml attributes or Xml sub-elements, move the current pointer to the parent node, and close any intermediate XML elements that were created in Step 3.

The foregoing may be used to generate an XML text representation of the object tree corresponding to the remedial action.

Figure 23:
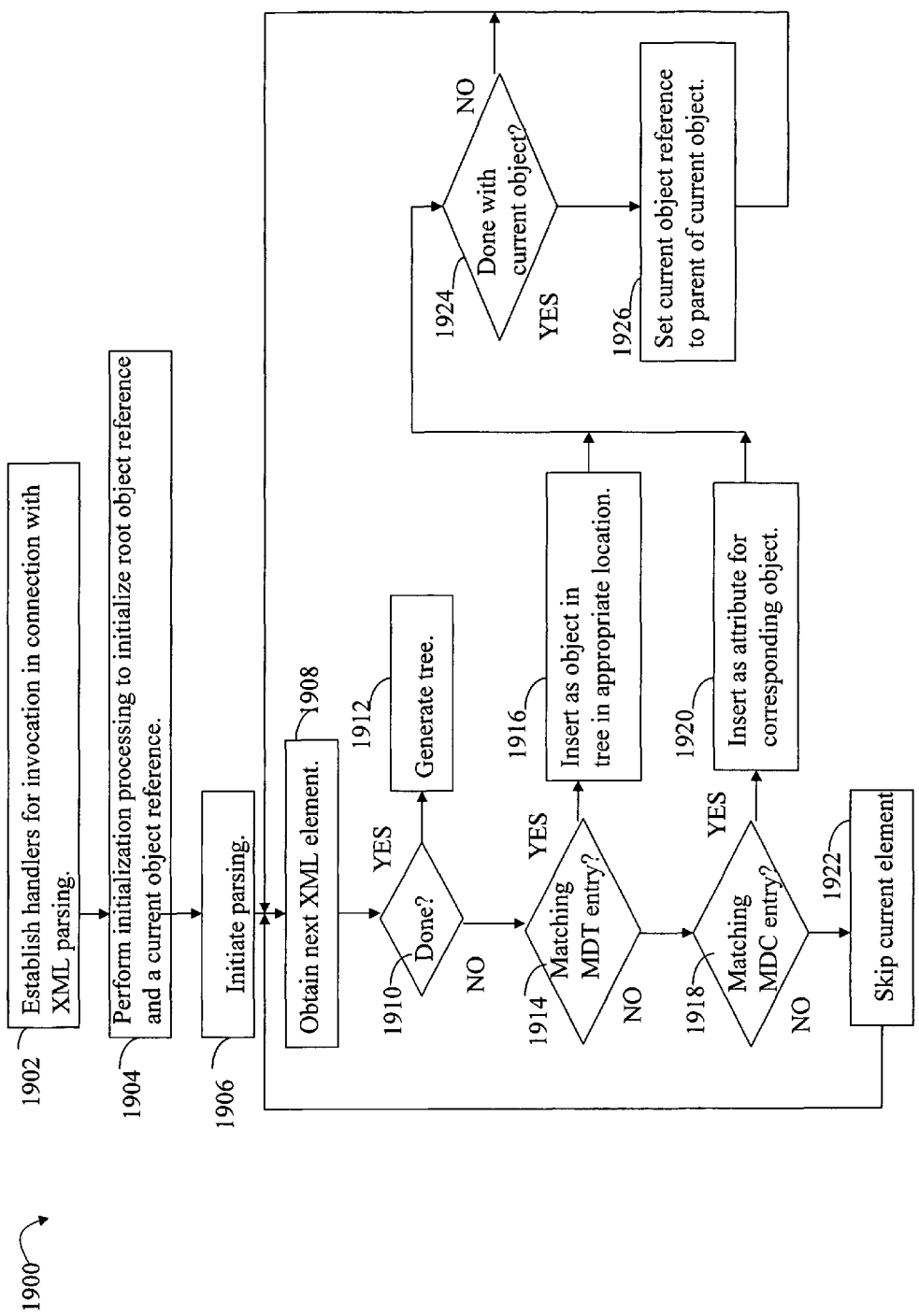
FIG. 23 is a flowchart of processing steps that may be performed in an embodiment in connection with converting an XML representation to an object representation.
Figure 24:
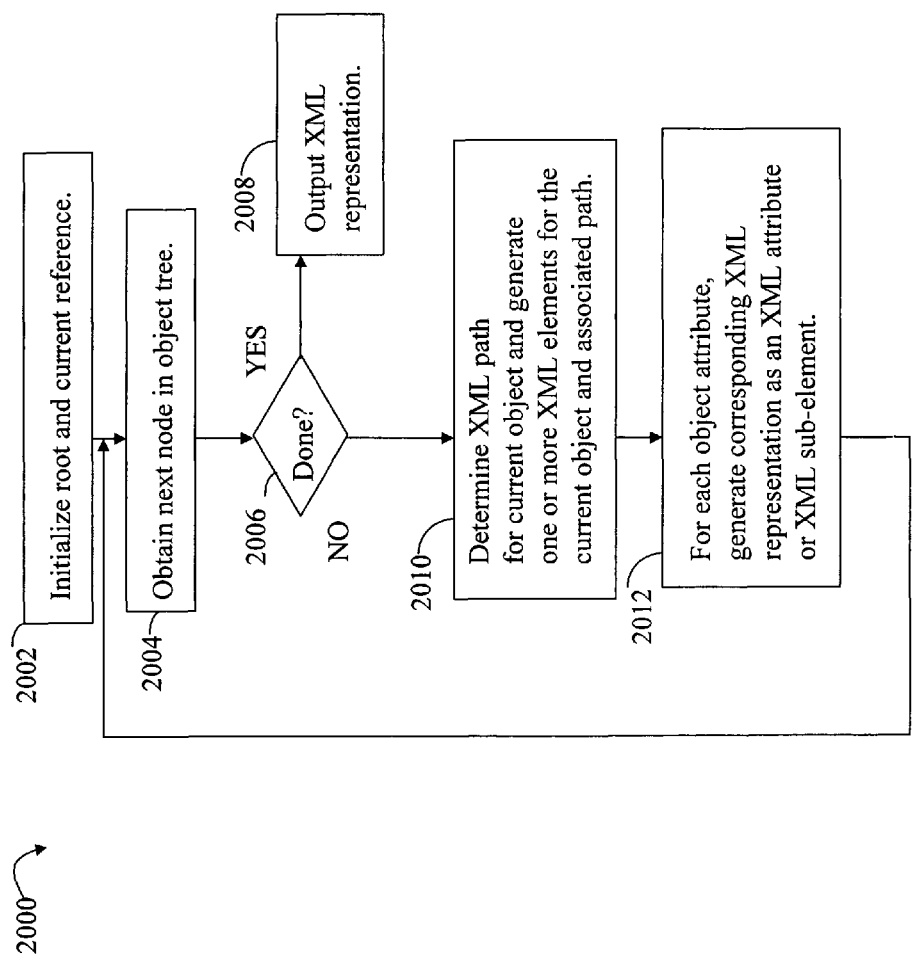
FIG. 24 is a flowchart of processing steps that may be performed in an embodiment in connection with converting an object representation to an XML representation.

Referring now to FIGS. 23 and 24, shown are flowcharts summarizing processing just described. FIG. 23 includes processing steps for converting an XML representation to an object representation. Flowchart 1900 includes processing steps as may be performed using a SAX parser but it will be appreciated by those skilled in the art that other parsing tools and techniques may be performed in connection with parsing the XML representation. At step 1902, the handlers used in connection with the XML parsing by the SAX parser are established. In step 1904, initialization processing may be performed to initialize a root object reference or pointer and a current object reference or pointer to the object currently being processed in the object tree. At step 1906, the parsing process is initiated to parse the XML representation. Control proceeds to step 1908 to obtain the next XML element. At step 1910, a determination is made as to whether processing is complete for all the XML input. If so, control proceeds to step 1912 to generate the object tree. Otherwise, control proceeds to step 1914 to determine if the current XML element matches a corresponding MDT entry. If so, control proceeds to step 1916 to insert a new object into the tree corresponding to the XML element in the appropriate tree hierarchical location. From step 1916, control proceeds to step 1924. If step 1914 evaluates to no, control proceeds to step 1918 to determine if the current XML element corresponds to an MDC entry. If so, control proceeds to step 1920 to insert a corresponding attribute for the current object into the tree. From step 1920, control proceeds to step 1924. If step 1918 evaluates to no, control proceeds to step 1922 where the current XML element is discarded or skipped since it is not relevant. Processing then continues with the next XML element in step 1908.

At step 1924, a determination is made as to whether processing is complete for the current object. If so, control proceeds to step 1926 to set the current object reference to the parent of the current object and then to continue with the next XML element in step 1908. If step 1924 evaluates to no, control proceeds to step 1908.

Referring to FIG. 24, shown is a flowchart of processing steps that may be performed in connection with converting an object representation to an XML representation. At step 2002, a root and current reference are initialized. In step 2004, a next node in the object tree is obtained for processing. As described herein, objects in the object tree may be processed in a depth-first fashion. At step 2006, a determination is made as to whether all nodes in the object tree have been processed. If so, control proceeds to step 2008 to output the XML representation. Otherwise, control proceeds to step 2010 to determine the XML path for the current object and generate one or more XML elements for the current object and its associated path. At step 2012, for each object attribute, a corresponding XML representation as an XML attribute or XML sub-element is generated. Control proceeds to step 2004 with the next node in the tree in accordance with a depth first processing technique.

As described herein, remedial action processing in connection with non-compliant device configuration state information may cause generation of an object representation. The object representation may be converted, either directly or with one or more intermediate conversions, to one or more device commands or other textual representations that are executed directly by a non-compliant device. The remedy generation may be performed automatically in the event any non-compliance is detected. The remedies, such as the device commands, may be applied automatically or may otherwise require user interaction, for example, for approval or selection where one or more possibilities may correct a non-compliant condition. An embodiment may also generate different forms of remedies in accordance with the particular embodiment which vary with the way in which devices are managed. For example, devices may be managed using the particulars as illustrated in the exemplary embodiment in which device drivers issue commands to devices as part of the configuration management. The commands to correct the device state may be the result of the remedial action. Rather than generate device commands using a device driver, an embodiment may also utilize an API (application programming interface) or web-based management system in which the device modifications or updates generated in connection with remedial action processing are not expressed as device commands. For example, the device updates or corrections may be specified as a device parameter and an associated value of an API. The API or other component may then perform the necessary processing steps to alter a device's configuration.

The compliance tests may utilize configuration state information stored in the database that may have been collected from other sources besides the managed devices. For example, data may be gathered from equipment inventory records or data retrieved from other foreign systems. If the latter data from other sources has a different representation, format, model and the like, than as collected from the managed devices, the metadata may be modified to accommodate for the differences. The particular metadata modifications may vary with the data to be integrated and stored in the database. For example, the metadata can be modified to accommodate the additional fields in the third party data. If the third party data uses a completely different data model, the metadata tables may also be used to provide an additional mapping between the different database models. If additional database tables are defined to accommodate the third party data, a new entry to the MDT can be made for each additional table, and the appropriate entries for the foreign key relationships of the new tables can be entered into the MDN table. If additional fields are defined to accommodate the third party data, a new entry may be added to MDC tables for each added field.

The techniques herein may be used to facilitate making any changes to the configuration state information, for example, as collected data format may be revised or modified. The metadata may be updated to define any new configuration data fields, remove or otherwise update any existing fields. Additionally, the metadata may be updated to accommodate any structural changes in the configuration state information. The forgoing may be performed without modifying the driver program or other software components that may be included in a released software product for compliance testing using the techniques herein. Additionally, the foregoing allows the compliance testing techniques to be used with configuration data having unknown formats, types, and the like, at the time the released software product is first made available for use. The techniques herein are flexible and extensible with respect to what configuration state information can be processed allowing a user to perform customizations to add his own types of data and constraints on that data in the compliance tests.

In connection with the foregoing examples, it will be appreciated by those skilled in the art that the particular details specified should not be construed to limit the techniques herein. For example, the number of tables, entries in each table, complexity of an expression, form of the query, tabular format, and the like, should not be construed as a limitation. Furthermore it will be appreciated by those skilled in the art that the techniques herein may also be applied for use with other areas besides configuration management. For example, the techniques herein may be used to test whether any type of data, such as may be stored in the data container, is compliant in accordance with criteria specified using the compliance rules. Remedial actions may be generated causing the database to be updated to include compliant information, causing a source generating the non-compliant data to be corrected, and the like.

As described herein, an embodiment may implement a relational database with various aspects of compliance testing (e.g., the compliance query, compliance rules, and query results) expressed in a corresponding relational form for use with the relational database. As will be appreciated by those skilled in the art, the techniques herein may be utilized in connection with a database including data stored therein in any one of a variety of different form and formats such as, for example, an object-based database. In such an embodiment, the data elements may correspond to an object representation expressed in terms of objects and associated attributes rather than a relational database model. In such an embodiment utilizing an object-based database, the compliance query and compliance rules, as specified by a user or compliance test author, and database query results may be expressed using a corresponding object representation. For example, the one or more query result sets may represent query results using a hierarchical object-attribute model or representation as illustrated in FIG. 8.

It should also be noted that an embodiment may also store data in a data container, such as a database as described herein, for use in connection with any one or more data processing operations. An embodiment may include functionality to implement the compliance testing as described herein. An embodiment may also include functionality, alone or in addition to compliance testing, for performing other operations such as reporting, viewing and other operations which utilize the configuration state information as stored in the data container. For example, in one embodiment including functionality for reporting, queries may be specified to retrieve configuration state information from the data container. The query results may be used in connection with forming a report on configuration state information for one or more devices. The queries may be user-specified in any one of a variety of different forms. The queries may be specified directly as SQL statements or other statements in accordance with the particular database implementation. Alternatively, an embodiment may provide a user interface, such as described herein, which is used to specify the query criteria and form the SQL or other database query language statements for data retrieval.

An exemplary application of the techniques herein for compliance testing is described in connection with device configuration state information. However, it will be appreciated by those skilled in the art that the compliance testing techniques herein may be used in connection with a testing the compliance of data in accordance with a variety of different compliance standards, specifications, requirements, and the like.

In connection with the financial field and application area, the techniques herein may be used in connection with performing a credit risk analysis of collected loan data on one or more individuals. The individuals may be loan applicants for which one or more different loan parameters are specified. The collected loan data for the individuals may be stored in the data container. Compliance testing may be performed to determine if the collected loan data is in accordance with specified compliance criteria associated with one or more different levels of credit risk. Remedies may generated which are adjustments to the loans for the individuals. For example, a set of loan criteria may be specified that an individual needs to meet in order to qualify for a low interest loan rate. If the individual's collected data does not meet the criteria, the remedy may be to make an adjustment to the loan conditions, for example, with a higher interest rate, additional money down if a purchase is being financed, and the like.

In connection with the financial field, the techniques herein may be used in connection with securities selection. Compliance testing may be performed to see if one or more selected securities meet a set of one or more compliance criteria such as, for example, earnings, growth, equity, margins, and the like. In the event a selected security does not meet the criteria, a remedy may be generated to sell all or a portion of the security not meeting the criteria. In connection with the portfolio management area, compliance testing may be performed to ensure that securities included in a particular investment portfolio are in accordance with specified portfolio compliance criteria such as, for example, diversification, investment objectives, risk level, and the like. A remedy in the event the securities in a portfolio do not meet the specified compliance criteria may be one or more suggested portfolio adjustments.

The techniques herein for compliance testing may be used in connection with drug prescription. Compliance testing may be performed to ensure that drugs are prescribed within the guidelines recommended by the manufacturer with respect to other concurrent medications, disease indications, and patient history. In the event of non-compliance, a remedy may be alternate or modified prescription recommendations.

The techniques herein for compliance testing may be used in connection with engineering design standards. Compliance testing may be performed to determine if an engineering design meets certain criteria, such as reserve load capacity, operational efficiency, government or other regulatory requirements. In the event of non-compliance, a remedy may be a recommendation for a material change or specification modification. In connection with engineering computer coding standards, compliance testing may be performed to see if code meets certain metrics such as, for example, a complexity metric, documentation guidelines, or a stylistic convention. In the event of non-compliance, a remedy may be a generated portion of revised code or list of issues to be addressed and possible recommendations.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing compliance testing comprising:
receiving configuration state information in a first form for each of one or more devices managed using a configuration management system, said first form of the configuration state information for said each device including information in one of a plurality of formats that vary with said each device;
performing a plurality of conversions to convert the first form of configuration state information for each of the one or more devices to a data container representation of the configuration state information;
storing the data container representation of the configuration state information in a data container;
executing one or more compliance tests using the configuration state information to determine if the one or more devices are compliant, said one or more compliance tests being defined using one or more queries and one or more compliance rules, said one or more queries used for retrieving a portion of said configuration state information from said data container and generating one or more result sets, said one or more compliance rules specifying compliance criteria used for determining whether said one or more result sets include configuration state information which is compliant;
determining whether a first of the one or more devices fails a first of the compliance tests; and
responsive to determining that the first device fails the first compliance test, automatically generating a corresponding remedial action including one or more device commands to make the first device compliant with an expected configuration state based on a portion of the compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:
generating an object representation of expected configuration state information corresponding to successful compliance with the first compliance test, the expected configuration state information including the first portion corresponding to corrected configuration state information of the first device, wherein said generating the object representation uses the first metadata and includes:

determining whether the second remedial action atomicity level indicator indicates it is allowable to generate the second object;
if the second remedial action atomicity level indicator indicates it is not allowable to generate the second object, generating the first object including the second object; and
if the second remedial action atomicity level indicator indicates it is allowable to generate the second object, generating the second object without requiring generation of other portions of the first object; and
converting the object representation of the expected configuration state information
to the one or more device commands.

2. The method of claim 1, wherein the data container is a relational database, and the one or more queries are relational queries.

3. The method of claim 1, wherein the data container is an object-based database using an object model, the one or more queries of the data container generate one or more result sets representing query results in a hierarchical object representation.

4. The method of claim 2, further comprising:
specifying the relational queries using a tabular form, the tabular form including a first section identifying one or more database tables and a second section identifying one or more database table columns and selection criteria used for determining said portion of the configuration state information to be included in the one or more result sets.

5. The method of claim 4, wherein the tabular form includes a third section identifying how to order rows of said one or more result sets.

6. The method of claim 4, further comprising:
forming one or more standard query language queries using the information included in the tabular form.

7. The method of claim 1, wherein the compliance rules include one or more rules defining one or more rows of configuration state information which are required to be included in the one or more result sets in order to determine that the one or more results sets include configuration state information which is compliant.

8. The method of claim 7, further comprising:
determining a device is a non-compliant device if configuration state information for the device is not included in the one or more result sets and is required to be included in the one or more result sets as specified in accordance with the compliance rules; and
generating a remedial action causing required configuration state information to be added to the non-compliant device.

9. The method of claim 1, wherein the compliance rules include one or more rules defining rows of configuration state information which are required not to be included in the one or more result sets in order to determine that the one or more results sets include configuration state information which is compliant.

10. The method of claim 9, further comprising:
determining a device is a non-compliant device if configuration state information for the device is included in the one or more result sets and is required not to be included in the one or more result sets as specified in accordance with the compliance rules; and
generating a remedial action causing configuration state information to be deleted from the non-compliant device.

11. The method of claim 1, wherein the compliance rules include one or more rules defining one or more attributes of configuration state information which are required to be included in each row of the one or more result sets in order to determine that the one or more results sets include configuration state information which is compliant.

12. The method of claim 11, further comprising:
determining a device is a non-compliant device if configuration state information for the device that is included in the one or more result sets omits a required attribute value or includes an incorrect attribute value as specified in accordance with the compliance rules; and
generating a remedial action causing configuration state information for an attribute value to be one of corrected or added from the non-compliant device in accordance with said compliance rules.

13. The method of claim 1, wherein the data container is a database and a structure of configuration state information as stored in the database is specified using metadata stored in the database, and wherein said automatically generating a corresponding remedial action further comprises:
using at least a portion of said metadata in connection with determining relevant database tables and database table columns of a non-compliant portion of configuration state information for the first device which caused failure of the first compliance test; and
constructing a portion of compliant configuration state information corresponding to the non-compliant portion.

14. The method of claim 13, wherein the metadata includes relationship information regarding relationships between objects of configuration state information represented in the database, the metadata describing how a first database table is joined with another database table when specifying a compliance query, the first and the second database tables being joined in connection with forming the one or more result sets.

15. The method of claim 14, wherein a first column in the first database table is associated with a second column in the other database table, said association between said first column and said second column being expressed in the metadata.

16. The method of claim 1, wherein at least one query includes object names used in representing configuration state information in a first representation, each of said object names having corresponding elements in a second representation describing how the configuration state information is stored in the data container, and the method including:
mapping object names in the at least one query to corresponding elements in the second representation using metadata when constructing a query to retrieve data from the data container.

17. The method of claim 16, further comprising:
using metadata to determine allowable operators in connection with constructing the query.

18. The method of claim 17, further comprising:
performing data validation using metadata to determine whether items included in the query are defined in a representation of the configuration state information.

19. The method of claim 1, wherein the data container stores more than one set of configuration information for at least one of the devices.

20. The method of claim 1, wherein the one or more compliance rules include at least one of the following types of rules: a first type of rule defining one or more rows of configuration state information which are required to be included in the one or more result sets in order to determine that the one or more results sets include configuration state information which is compliant, a second type of rule defining rows of configuration state information which are required not to be included in the one or more result sets in order to determine that the one or more results sets include configuration state information which is compliant, and a third type of rule defining one or more attributes of configuration state information which are required to be included in each row of the one or more result sets in order to determine that the one or more results sets include configuration state information which is compliant.

21. The method of claim 1, wherein the plurality of conversions performed for converting the first form of configuration information for said each device to a data container representation of the configuration state information includes converting the vendor-neutral representation of the configuration state information to an object representation of the configuration state information for said each device, and converting the object representation of the configuration state information for said each device to the data container representation of the configuration state information.

22. The method of claim 1, wherein said one or more result sets includes a first result set for a first of the one or more devices, said first result set comprising one or more rows of information each including one or more fields of information identifying the first device and a network address in a first-named column, and wherein the one or more compliance rules include a first rule specifying a first network address as a value for the first-named column, and wherein, in order for the first result set to be compliant, the first result set needs to include a row with a network address in the first-named column that matches the first network address.

23. The method of claim 22, wherein the first result set includes a destination port number in a second-named column and wherein the first rule further includes a first destination port number as a value for the second-named column, and wherein, in order for the first result set to be compliant, the first result set needs to include a row with a network address in the first-named column that matches the first network address and a destination port number in the second-named column that matches the first destination port number.

24. A network configuration management system comprising:
a device server collecting configuration information from one or more devices managed using the network configuration management system;
one or more application servers which store the configuration information in a database and perform compliance testing on the configuration information using one or more compliance tests comprising compliance queries and compliance rules, the compliance queries used to retrieve portions of the configuration information from the database forming one or more result sets which are tested for compliance in accordance with the compliance rules; and
a computer readable medium comprising code stored thereon for performing processing including:
receiving, at said device server, configuration state information in a first form for each of said one or more devices, said first form of the configuration state information for said each device including information in one of a plurality of formats that vary with said each device;
performing, by said one or more application servers, a plurality of conversions to convert the first form of configuration state information for each of the one or more devices to a database representation of the configuration state information;
storing the database representation of the configuration state information in the database;
determining whether a first of the one or more devices fails a first of the compliance tests, said first compliance test using one or more compliance rules; and
responsive to determining that the first device fails the first compliance test, automatically generating a corresponding remedial action including one or more device commands to make the first device compliant with an expected configuration state based on a portion of the compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:
generating an object representation of expected configuration state information corresponding to successful compliance with the first compliance test, the expected configuration state information including the first portion corresponding to corrected configuration state information of the first device, wherein said generating the object representation uses the first metadata and includes:
determining whether the second remedial action atomicity level indicator indicates it is allowable to generate the second object;
if the second remedial action atomicity level indicator indicates it is not allowable to generate the second object, generating the first object including the second object; and
if the second remedial action atomicity level indicator indicates it is allowable to generate the second object, generating the second object without requiring generation of other portions of the first object; and
converting the object representation of the expected configuration state information
to the one or more device commands.

25. A method for performing compliance testing comprising:
receiving configuration state information in a first form for each of one or more devices managed using a configuration management system;
performing a plurality of conversions to convert the first form of configuration state information for each of the one or more devices to a database representation of the configuration state information;
storing the database representation of the configuration state information in a database;
performing one or more compliance tests using the configuration state information to determine if the one or more devices are compliant, wherein said configuration state information is represented in accordance with a data representation described using metadata, wherein said performing uses the metadata in connection with processing at least one of: one or more compliance queries for retrieving data from the database for compliance testing, and one or more compliance rules specifying compliance criteria;

determining whether a first of the one or more devices fails a first of the compliance tests; and responsive to determining that the first device fails the first compliance test, automatically generating a corresponding remedial action including one or more device commands to make the first device compliant with an expected configuration state based on a portion of the compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:

generating an object representation of expected configuration state information corresponding to successful compliance with the first compliance test, the expected configuration state information including the first portion corresponding to corrected configuration state information of the first device, wherein said generating the object representation uses the first metadata and includes:

determining whether the second remedial action atomicity level indicator indicates it is allowable to generate the second object;

if the second remedial action atomicity level indicator indicates it is not allowable to generate the second object, generating the first object including the second object; and if the second remedial action atomicity level indicator indicates it is allowable to generate the second object, generating the second object without requiring generation of other portions of the first object; and converting the object representation of the expected configuration state information to the one or more device commands.

26. The method of claim 25, wherein the metadata identifies one or more relational database tables of the database describing the data representation of the configuration state information.

27. The method of claim 26, wherein the metadata identifies one or more columns in the one or more relational database tables describing the data representation.

28. The method of claim 26, wherein the metadata describes one or more relationships between different types of objects.

29. The method of claim 28, wherein the relationships represented using the metadata include one or more of: one to one, many to many, many to one, one to many, hierarchical, non-hierarchical, and revisioned for multiple versions of configuration information.

30. The method of claim 28, wherein said automatically generating a remedial action uses metadata describing the relationships between objects to form a compliant object including compliant information in accordance with compliance test failure.

31. The method of claim 26, wherein the metadata includes information used to convert configuration state information between a first form as collected by a device server and a second form which is an object representation, and to convert between the second form and a third form which is a relational database representation as stored in the database.

32. The method of claim 25, wherein the metadata describes an external data representation and the metadata is used to convert data from the external data representation to the data representation for use with the database, and metadata describing the external data representation is accordingly modified if there is a modification to the external data representation.

33. The method of claim 25, wherein the metadata is used in said performing to map a logical name of an object representation to a corresponding entity in a relational database representation, the logical name being included in at least one of a compliance query or a compliance rule.

34. The method of claim 33, wherein the metadata includes attribute information used to implicitly join a plurality of database tables corresponding to a single object in the object representation.

35. The method of claim 25, wherein the metadata is stored in the database.

36. A method for performing reporting on a configuration state of one or more devices comprising:

receiving configuration state information in a first form for each of one or more devices managed using a configuration management system, said first form of the configuration state information for said each device including information in one of a plurality of formats that vary with said each device;

performing a plurality of conversions to convert the first form of configuration state information for each of the one or more devices to a database representation of the configuration state information storing the database representation of the configuration state information in a database;

performing one or more database queries using metadata, wherein the metadata identifies one or more relational database tables of the database describing the data representation of said configuration state information, identifies one or more columns in the one or more relational database tables describing a data representation of the configuration state information, and identifies one or more relationships between different types of objects in said configuration state information;

forming, in response to said performing, one or more query results;

using the one or more query results in a report;

determining whether a first of the one or more devices fails a first compliance test; and responsive to determining that the first device fails the first compliance test, automatically generating a corresponding remedial action including one or more device commands to make the first device compliant with an expected configuration state based on a portion of compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:
- generating an object representation of expected configuration state information corresponding to successful compliance with the first compliance test, the expected configuration state information including the first portion corresponding to corrected configuration state information of the first device, wherein said generating the object representation uses the first metadata and includes:
  - determining whether the second remedial action atomicity level indicator indicates it is allowable to generate the second object;
  - if the second remedial action atomicity level indicator indicates it is not allowable to generate the second object, generating the first object including the second object; and
  - if the second remedial action atomicity level indicator indicates it is allowable to generate the second object, generating the second object without requiring generation of other portions of the first object; and
- converting the object representation of the expected configuration state information
- to the one or more device commands.

37. The method of claim 36, wherein the relationships represented using the metadata include one or more of: one to one, many to many, many to one, one to many, hierarchical, non-hierarchical, and revisioned for multiple versions of configuration information.

38. The method of claim 36, wherein the metadata includes information used to convert configuration state information between a first form as collected by a device server and a second form which is an object representation, and to convert between the second form and a third form which is a relational database representation as stored in the database.

39. The method of claim 36, wherein the metadata describes an external data representation and the metadata is used to convert data from the external data representation to the data representation for use with the database, and metadata describing the external data representation is accordingly modified if there is a modification to the external data representation.

40. The method of claim 36, wherein the metadata includes attribute information used to implicitly join a plurality of database tables corresponding to a single object in the object representation.

41. The method of claim 36, wherein the metadata is stored in the database.

42. A computer readable medium comprising code stored thereon for performing compliance testing, the computer readable medium comprising code stored thereon that, when executed by a processor, performs a method comprising:
- receiving configuration state information in a first form for each of one or more devices managed using a configuration management system, said first form of the configuration state information for said each device including information in one of a plurality of formats that vary with said each device;
- performing a plurality of conversions to convert the first form of configuration state information for each of the one or more devices to a data container representation of the configuration state information;
- storing the data container representation of the configuration state information in a data container;
- executing one or more compliance tests using the configuration state information to determine if the one or more devices are compliant, said one or more compliance tests being defined using one or more queries and one or more compliance rules, said one or more queries used for retrieving a portion of said configuration state information from said data container and generating one or more result sets, said one or more compliance rules specifying compliance criteria used for determining whether said one or more result sets include configuration state information which is compliant;
- determining whether a first of the one or more devices fails a first of the compliance tests; and
- responsive to determining that the first device fails the first compliance test, automatically generating a corresponding remedial action including one or more device commands to make the first device compliant with an expected configuration state based on a portion of the compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:
- generating an object representation of expected configuration state information corresponding to successful compliance with the first compliance test, the expected configuration state information including the first portion corresponding to corrected configuration state information of the first device, wherein said generating the object representation uses the first metadata and includes:
  - determining whether the second remedial action atomicity level indicator indicates it is allowable to generate the second object;
  - if the second remedial action atomicity level indicator indicates it is not allowable to generate the second object, generating the first object including the second object; and
  - if the second remedial action atomicity level indicator indicates it is allowable to generate the second object, generating the second object without requiring generation of other portions of the first object; and
- converting the object representation of the expected configuration state information
- to the one or more device commands.

43. The computer readable medium of claim 42, wherein the data container is a relational database, and the one or more queries are relational queries.

44. The computer readable medium of claim 43, wherein the method further comprises:
- specifying the relational queries using a tabular form, the tabular form including thea first section identifying one or more database tables and a second section identifying one or more database table columns and selection criteria used for determining said portion of the configuration state information to be included in the one or more result sets.

45. The computer readable medium of claim 44, wherein the tabular form includes a third section identifying how to order rows of said one or more result sets.

46. The computer readable medium of claim 45, wherein the method further comprises:
forming one or more standard query language queries using the information included in the tabular form.

47. The computer readable medium of claim 42, wherein the compliance rules include one or more rules defining one or more rows of configuration state information which are required to be included in the one or more result sets in order to determine that the one or more results sets include configuration state information which is compliant.

48. The computer readable medium of claim 42, wherein the compliance rules include one or more rules defining rows of configuration state information which are required not to be included in the one or more result sets in order to determine that the one or more results sets include configuration state information which is compliant.

49. The computer readable medium of claim 42, wherein the compliance rules include one or more rules defining one or more attributes of configuration state information which are required to be included in each row of the one or more result sets in order to determine that the one or more results sets include configuration state information which is compliant.

50. A computer readable medium comprising code stored thereon for performing compliance testing, the computer readable medium comprising code that, when executed by a processor, performs a method comprising:
receiving configuration state information in a first form for each of one or more devices managed using a configuration management system, said first form of the configuration state information for said each device including information in one of a plurality of formats that vary with said each device;
performing a plurality of conversions to convert the first form of configuration state information for each of the one or more devices to a database representation of the configuration state information;
storing the database representation of the configuration state information in a database;
performing one or more compliance tests using the configuration state information to determine if the one or more devices are compliant, wherein said configuration state information is represented in accordance with a data representation described using metadata, wherein said performing uses the metadata in connection with processing at least one of: one or more compliance queries for retrieving data from the database for compliance testing, and one or more compliance rules specifying compliance criteria;
determining whether a first of the one or more devices fails a first of the compliance tests; and
responsive to determining that the first device fails the first compliance test, automatically generating a corresponding remedial action including one or more device commands to make the first device compliant with an expected configuration state based on a portion of the compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:
generating an object representation of expected configuration state information corresponding to successful compliance with the first compliance test, the expected configuration state information including the first portion corresponding to corrected configuration state information of the first device, wherein said generating the object representation uses the first metadata and includes:
determining whether the second remedial action atomicity level indicator indicates it is allowable to generate the second object;
if the second remedial action atomicity level indicator indicates it is not allowable to generate the second object, generating the first object including the second object; and
if the second remedial action atomicity level indicator indicates it is allowable to generate the second object, generating the second object without requiring generation of other portions of the first object; and
converting the object representation of the expected configuration state information
to the one or more device commands.

51. The computer readable medium of claim 50, wherein the metadata identifies one or more relational database tables of the database describing the data representation of the configuration state information.

52. The computer readable medium of claim 51, wherein the metadata describes one or more relationships between different types of objects, and wherein the relationships represented using the metadata include one or more of: one to one, many to many, many to one, one to many, hierarchical, non-hierarchical, and revisioned for multiple versions of configuration information.

53. The computer readable medium of claim 52, wherein said automatically generating a remedial action uses metadata describing the relationships between objects to form a compliant object including compliant information in accordance with compliance test failure.

54. A computer readable medium comprising code stored thereon for performing reporting on a configuration state of one or more devices, the computer readable medium comprising code that, when executed by a processor, performs a method comprising:
receiving configuration state information in a first form for each of one or more devices managed using a configuration management system, said first form of the configuration state information for said each device including information in one of a plurality of formats that vary with said each device;
performing a plurality of conversions to convert the first form of configuration state information for each of the one or more devices to a database representation of the configuration state information;
storing the database representation of the configuration state information in a database;
performing one or more database queries using metadata, wherein the metadata identifies one or more relational database tables of the database describing the data representation of said configuration state information, identifies one or more columns in the one or more relational database tables describing a data representation of the configuration state information, and identifies one or more relationships between different types of objects in said configuration state information;

forming, in response to said performing, one or more query results;

using the one or more query results in a report;

determining whether a first of the one or more devices fails a first compliance test; and responsive to determining that the first device fails the first compliance test, automatically generating a corresponding remedial action including one or more device commands to make the first device compliant with an expected configuration state based on a portion of compliance criteria of the first compliance test, wherein first metadata describes a hierarchical object model including a first object and a second object nested in the first object, the first metadata including a first remedial action atomicity level indicator for the first object indicating it is allowable for remedial action processing to generate the first object, the first metadata including a second remedial action atomicity level indicator for the second object indicating whether it is allowable for remedial action processing to generate the second object, said second object including a first portion corresponding to corrected configuration state information of the first device, wherein said automatically generating the corresponding remedial action includes performing first processing comprising:

generating an object representation of expected configuration state information corresponding to successful compliance with the first compliance test, the expected configuration state information including the first portion corresponding to corrected configuration state information of the first device, wherein said generating the object representation uses the first metadata and includes:

determining whether the second remedial action atomicity level indicator indicates it is allowable to generate the second object;

if the second remedial action atomicity level indicator indicates it is not allowable to generate the second object, generating the first object including the second object; and if the second remedial action atomicity level indicator indicates it is allowable to generate the second object, generating the second object without requiring generation of other portions of the first object; and converting the object representation of the expected configuration state information to the one or more device commands.

55. The computer readable medium of claim 54, wherein the relationships represented using the metadata include one or more of: one to one, many to many, many to one, one to many, hierarchical, non-hierarchical, and revisioned for multiple versions of configuration information.

* * * * *